United States Patent [19]

Smith

[11] Patent Number: 4,625,100

[45] Date of Patent: Nov. 25, 1986

[54] CODED DATA CARRIER AND READER AND ELECTRONIC SECURITY TOUR SYSTEM EMPLOYING SAME

[75] Inventor: Arthur E. Smith, Duluth, Ga.

[73] Assignee: Lathem Time Recorder Co., Inc., Atlanta, Ga.

[21] Appl. No.: 608,391

[22] Filed: May 9, 1984

[51] Int. Cl.[4] .................... G06K 7/10

[52] U.S. Cl. .................... 235/458; 235/377; 235/454; 235/461; 235/468; 235/489; 340/825.55

[58] Field of Search .................... 235/377, 454, 382, 460, 235/468, 489, 472, 458, 461; 340/825.49, 825.55, 825.31; 346/86

[56] References Cited

U.S. PATENT DOCUMENTS

| | | | |
|---|---|---|---|
| Re. 28,081 | 7/1974 | Travioli | 235/468 X |
| 3,688,269 | 8/1972 | Miller | 235/458 X |
| 3,733,862 | 5/1973 | Killmeyer | 340/825.31 X |
| 3,990,067 | 11/1976 | Van Dusen et al. | 340/825.49 X |
| 4,180,204 | 12/1979 | Koenig et al. | 235/472 X |
| 4,298,792 | 11/1981 | Granholm et al. | 235/458 X |
| 4,333,085 | 6/1982 | Witts | 235/377 X |
| 4,377,741 | 3/1983 | Brekka et al. | 235/472 |
| 4,492,855 | 1/1985 | Garczynski et al. | 235/458 |

FOREIGN PATENT DOCUMENTS

| | | | |
|---|---|---|---|
| 629013 | 3/1982 | Switzerland | 235/458 |

*Primary Examiner*—David L. Trafton

*Attorney, Agent, or Firm*—Charles W. Helzer; Ira C. Edell; Patrick F. Henry

[57] ABSTRACT

A watchman's tour recording system includes a portable housing containing a data reader for reading and recording data from tour stations and a printer for printing out recorded station data and entry time in alphanumeric form. The printer is located in a locked compartment and is accessible by supervisory personnel for periodic tour entry monitoring. Station keys carry coded identification as a linear array of apertures filled with alternative pellet materials which are transmissive or non-transmissive to infrared light but are visibly indistinguishable. Strobe holes are positioned in a parallel linear array for synchronizing data reading. During assembly, the pellets are mutually distinguishable by split and continuous rings which serve as energy directors during ultrasonic welding of the pellets into the key, and which are hidden from view in the assembled product. A key reader in the portable housing includes a passage across which three infrared beams are directed toward respective infrared detectors, one for successively reading coded pellet data during key insertion and withdrawal, another for detecting strobe holes, and a third for detecting full insertion of the key. The strobe hole detector beam is pulsedly emitted until a key entry is sensed; thereafter, a read mode of limited duration is established wherein all three beams are energized continuously, and during which a key must be inserted and withdrawn for a valid code reading to take place. Data detected during insertion and withdrawal is compared to assure valid readings.

36 Claims, 25 Drawing Figures

CODED DATA CARRIER AND READER AND ELECTRONIC SECURITY TOUR SYSTEM EMPLOYING SAME

BACKGROUND OF THE INVENTION

I. Technical Field

The present invention relates to electronic security tour recording systems of the type used by a watchman in recording his attendance at specified tour stations. The invention also relates to coded data carriers and coded data readers which may be employed in such systems.

II. Discussion of the Prior Art

It is important in many industrial and commercial establishments that periodic security checks be conducted at different stations or locations within the establishment premises. In conducting such security checks, watchmen generally follow a pre-arranged tour or itinerary so that critical areas may be checked at prescribed times. It is important that a record be provided of the individual checks made by the watchmen, particularly for purposes of satisfying insurance company requirements, but also to permit supervisory personnel to assure that the appropriate security checks have been made.

Prior art electronic security tour recording systems are of two general types. The first type, as exemplified by U.S. Pat. No. 3,990,067 (Van Dusen et al) employs a portable key carried by the watchman who inserts the key into appropriate key readers at various tour stations. Station identification signals are transmitted from the visited tour stations via hard wire line, radio transmission, or the like, to a remote monitoring location at which the signals are processed. second type of electronic security tour recording system is typified by U.S. Pat. Nos. 3,922,649 (Thome) and 3,959,633 (Lawrence et al). These systems employ a code reader which is carried by the watchman to the various stations at which respective coded station keys are inserted into the reader. The reader stores the station key identification code, and in some cases the time of insertion, for subsequent read out of the stored information into a central computer. Hardcopy print out of station check data may be obtained from the central computer. Both types of systems described above require a central processor, or the like, in addition to the watchman's unit, to provide a hardcopy record of a tour.

It is also known in the prior art, as disclosed in the aforementioned Lawrence et al patent,to provide optical reading of an optically coded key located at each tour station. The Lawrence et al key takes the form of a rigid body member having a multiplicity of light transmitting holes defined therein. Insertion of the key into a portable reader actuates a similar multiplicity of light sources which transmit respective sensing beams across a space into which the key is inserted. Multiple sensors receive the respective beams, or not, depending upon the open and closed bit code of the holes in the key. This parallel sensing requires one light source for each code bit; thus, the system experiences considerable battery drain during code reading operations, a problem which is significant in a portable unit that must be used for one or more relatively long tours of the security stations. A need for frequent battery charging removes the watchman's unit from use for a considerable period of time. In addition, since each key code is clearly evident by its visible hole pattern, a watchman can readily fabricate a master key in which the holes can be selectively blocked or unblocked for use in making entries into the reader without actually touring the security stations.

The prior art discloses opto-electronic card readers using serially-arranged bits in a data carrier which are read in sequence as the carrier is inserted into a reader. An example of such a reader is found in U.S. Pat. No. 4,237,375 (Granholm). The coded data carrier in this reader is a laminated card member wherein the card field bits are hidden from view. If a data field is improperly formed during assembly, or if it becomes inoperative due to use or mis-use, the assembler or user is not aware of the problem unless and until the card is not read properly by the reader. Moreover, the inability of the user to see the data fields results in frequent improper orientation of the code carrier into the reader. Further, the Granholm patent discloses a data reading scheme wherein two spaced light beams are required to sense the data fields, the beams being mutually spaced to distinguish proper card insertion into the reader from insertions which are too slow. The insertion discrimination requires circuitry for analyzing the two pulse trains from the respective data beam sensors. It is desirable to eliminate the need for two data sensors, particularly where the beams must be critically spaced with respect to the data field spacing. Further, it is desirable to eliminate the need for comparing and analyzing two contemporaneous pulse trains for critical phase variations.

The aforementioned Lawrence et al patent recognizes that battery drain caused by the parallel data sensing beams can be minimized by emitting these beams only when a key is inserted into the reader. To this end, Lawrence et al provide two sensing light sources, in addition to the parallel data beam sources, which emit pulsed key detector beams. Interruption of the key detector beam pulses by a key results in energization of the data beams. It is desirable to eliminate the need for additional beam sources and detectors used expressly for detecting key presence.

OBJECTS AND SUMMARY OF THE INVENTION

It is therefore an object of the present invention to provide an electronic security tour recording system which yields a hardcopy read out directly from a portable key code reader, thereby eliminating the need to interface the code reader or tour station with a central computer.

It is another object of the present invention to provide a coded key and key reader arrangement, having particular utility for electronic security tour recording systems, wherein the coded key has distinct binary coded data fields which are readily discernible but wherein binary zero data fields are visibly and tactually indistinguishable by the user from binary one data fields.

Another object of the present invention is to provide a coded key and key reader arrangement, having particular utility for electronic security tour recording systems, wherein spaced data fields are read sequentially by a single data beam that is continuously emitted for a specified limited time interval upon insertion of a key into the reader.

It is still another object of the present invention to provide a coded key and key reader arrangement, having particular utility for electronic security tour recording systems, wherein key insertion into the reader is detected by a pulsed sensing beam that is also used in a continuous mode to clock or synchronize serial reading of the data fields.

A further object of the present invention is to provide an electronic security tour recording system in which a portable code reader is carried by a watchman and contains a microprocessor and printer to permit reading, storing and printing out of all tour information, and wherein opto-electronic data coding and reading is achieved with a minimal number of opto-electronic sensors.

In accordance with the present invention a portable key reader for use by a watchman during a security tour has all of the data reading, processing, recording and print out components disposed in the portable unit. The printer is disposed in a locked compartment of the unit and is accessible by supervisory personnel to permit periodic alphanumeric print out of stored station and time data. Key reading, data processing and data storage functions are powered by a battery which is also disposed in the portable housing. The housing is also provided with an a.c. adapter to permit use of normal a.c. power to operate the printer and charge the battery.

The keys or data carriers are disposed at respective stations and are binary coded to identify those stations Each code bit takes the form of a pellet or insert disposed in a respective aperture defined through the key. The pellets are either transmissive or non-transmissive to infrared light, but are visibly and tactually indistinguishable. For purposes of distinguishing between transmissive and non-transmissive pellets during assembly, each pellet is configured to be sub-divided into two longitudinal sections of different cross-sectional size which are separated by a peripheral shoulder The shoulder abuts a similar ledge or shoulder in the similarly configured aperture in which the pellet is disposed. A ridge of material projects axially from the pellet shoulder and forms a closed loop or a broken loop, depending upon the infrared transmission characteristic of the pellet. The ridge also serves as an energy director during ultrasonic welding of the pellet to the key body in the aperture.

The pellet filled apertures are spaced longitudinally in the key body to permit serial or sequential reading of the individual pellet data bits by a single data reading infrared detector in the portable data reader. A key receiving passage in the data reader has an infrared data source disposed on one side, positioned to emit a data beam across the passage to an infrared data detector The beam is positioned to strike each data bit in sequence as the key is inserted into and withdrawn from the passage, and to pass through the bit or not in accordance with the infrared transmission characteristic of the bit. A clocking or synchronizing beam emitter is disposed to issue a synchronizing beam across the passage to sequentially pass through the synchronization holes spaced longitudinally in the key adjacent respective data bits, thereby permiting the reader processing circuitry to determine when a data bit is passing through the data beam. The synchronizing beam is preferably in the infrared portion of the spectrum and is pulsed at a very low duty cycle when no key is present in the reader passage, thereby establishing a standby mode. Entry of a key into the passage interrupts the standby mode beam pulses to establish a read mode in which both the data and the synchronization beams are continuously emitted for a predetermined read time interval (e.g., on the order of a few seconds). If a valid read operation is not completed within that time interval, the operation is rejected and the code data is not stored. An end-of-key detector beam, also preferably in the infrared portion of the spectrum, is disposed in the passage so as to be interrupted when a key has been fully inserted (i.e., all the data bits have passed through the data beam). If the proper number of bits are sequentially detected during key insertion (i.e., before interruption of the end-of-key beam), these bits are compared to the plural bits which are sequentially detected during key withdrawal (i.e., after interruption of the end-of-key beam). If a match is detected within the prescribed read operation time interval, the detected data is stored along with the time of entry, the latter being provided by an internal clock located in the portable housing. The end-of-key beam is off in the standby mode and is energized continuously during the read mode along with the data and synchronization beams.

BRIEF DESCRIPTION OF THE DRAWINGS

These and other objects, features and many of the advantages of the present invention will be apparent from the following description considered in conjunction with the accompanying drawings wherein each element illustrated in more than one figure is designated by the same reference numeral in each figure, and wherein:

FIGS. 20–25 are flow charts representing the program which controls the microprocessor in the data reader, wherein: FIG. 20 is the main system flow chart; FIG. 21 is the flow chart for the key reading operational sequence; FIG. 22 is the flow chart for the print mode sequence; FIG. 23 is the flow chart for the low battery detection sequence; FIG. 24 is the flow chart for the open case detection sequence; and FIG. 25 is the flow chart for the display update sequence.

DESCRIPTION OF THE PREFERRED EMBODIMENTS

Figure 1:
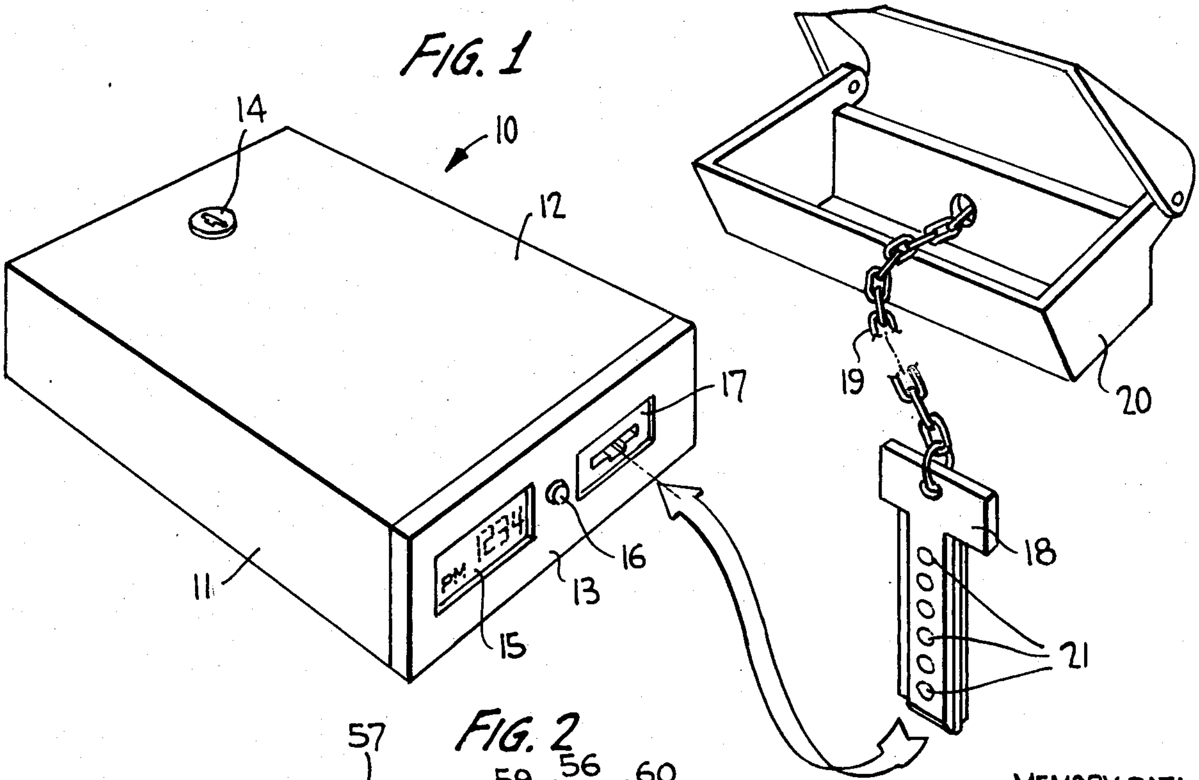
FIG. 1 is a view in perspective of a coded data key and a portable data reader constructed in accordance with the present invention.

Referring specifically to FIG. 1 of the accompanying drawings, a portable data reader and recorder 10 includes a housing 11 having a removable cover 12 and a front panel 13. A lock 14 is provided on cover 12 to secure the cover to housing 11. When the data reader and recorder 10 is used as part of a security tour recording system, the key for lock 14 is generally in the possession of supervisory personnel who remove the cover after one or more tours to permit access to the recorded data.

Front panel 13 includes a liquid crystal display (LCD) 15 which alternatively displays the time of day and the date. In addition, a "LO" low battery indicator is provided on the display to indicate when the internal housing battery voltage is below a predetermined level. Adjacent display 15 is an indicator 16 which is actuated when a coded data carrier or key has been validly inserted and read by the data reader 10. Data keys to be read are inserted into a data reading passage or slot, the access opening of which is covered by a dust cover 17 at front panel 13. Dust cover 17 is a panel which can be manually slid in a plane parallel to the front panel to provide the necessary access to the protected data reading passage.

One of multiple differently coded data keys 18 is shown secured by means of chain 19 to a storage box 20 in which key 18 is normally disposed. Such storage boxes are located at respective security tour stations and are opened by the tour watchman to use the key for entering tour data. Each key is provided with a plurality (i.e., six in the illustrated embodiment) of apertures 21 disposed in a spaced array lengthwise of the key. Apertures 21 are binary coded by filling them with material which is either transmissive or non-transmissive of infrared light energy, depending upon the code state of each aperture or bit 21. The details of the key and the manner of its coding are described in detail below in relation to FIGS. 6–14; for present purposes, however, it should be noted that the two coded filling materials preferably are indistinguishable visibly and tactually so that the code cannot be ascertained by touching or viewing the key. On the other hand, the locations of the coded aperture are in plain view to the user.

Housing 11 and cover 12 may be made of durable metal or plastic material. In addition, provisions may be made for securing a shoulder strap to the housing to facilitate carrying the unit from station to station. The entire data reader and recorded unit 10 typically weighs less than three (3) pounds.

Figure 2:
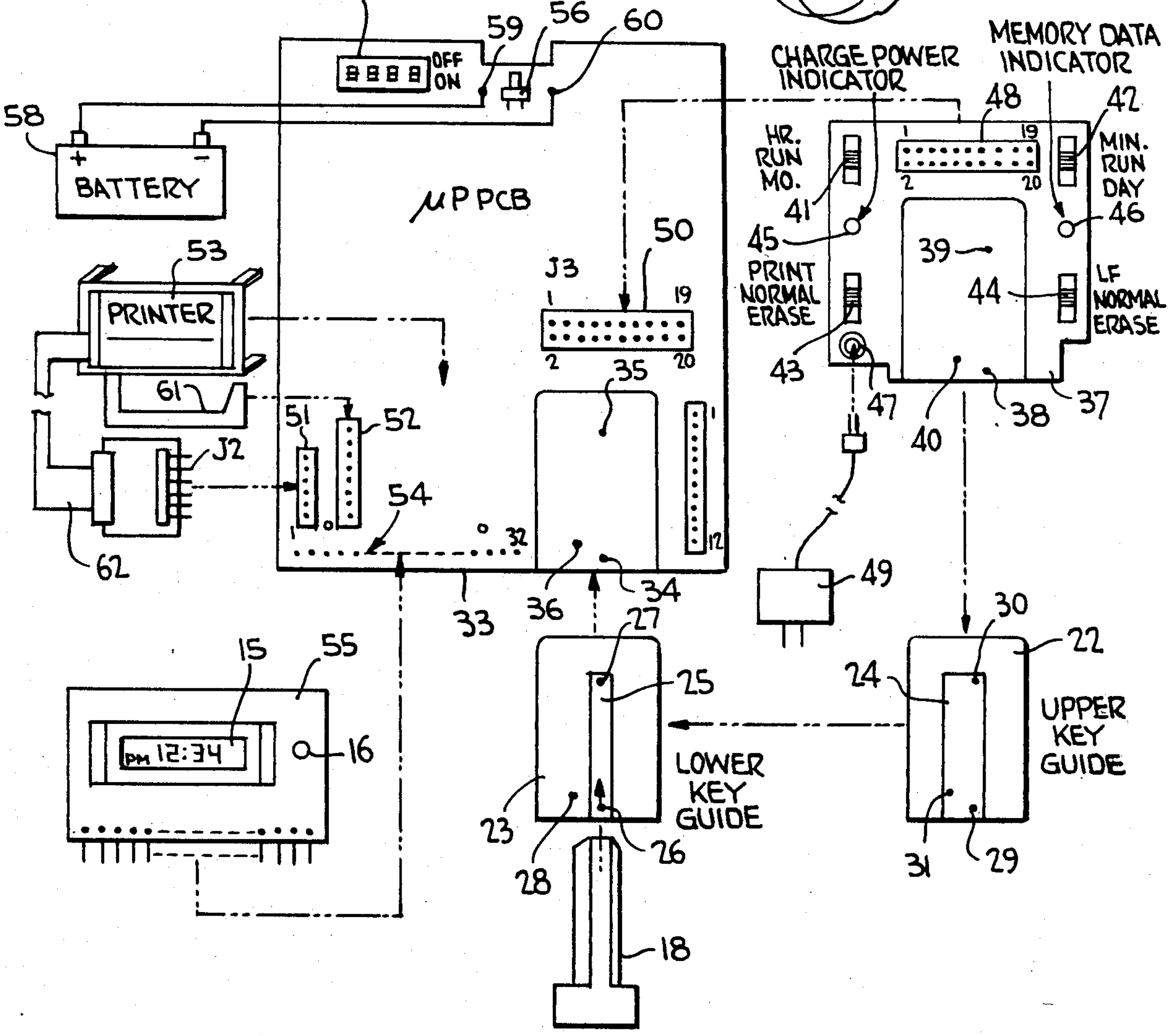
FIG. 2 is a functional block diagram of the data reader of FIG. 1.

The components disposed within housing 11 and forming part of the data reader and recorder 10 are illustrated in block diagram form in FIG. 2 to which specific reference is now made. A key guide, which is disposed under dust cover 17 (FIG. 1), includes an upper guide member 22 and a lower guide member 23. The physical orientation of the upper and lower guide members is described in detail below in relation to FIG. 5. These members are both recessed at 24 and 25, respectively, to define a data reading passage or slot between them for receiving data keys 18 and reading the coded identification data therefrom. Recess 24 in upper guide member 22 is transversely wider than recess 25 in lower guide member 23 so that the data reading passage has two different depths along its width. Three slots or throughbores 26, 27 and 28 are defined in lower guide member 23 and are adapted to receive respective infrared sources or beam emitters. Slot 26 is disposed in recess 25 just inside the entry end of the data reading passage. Slot 27 is disposed in recess 25 near the interior end of the data reading passage. Slot 28 is defined adjacent recess 25, slightly inward (i.e., closer to slot 27) of slot 26. Slot 26 is positioned to permit a data beam emitted therefrom, across the data reading passage, to sequentially impinge upon the material-filled apertures 21 of key 18. Slot 27 is positioned to permit an end-of-key beam emitted therefrom across the data reading passage to be intercepted by the forward end of a key 18 after all of the data bits or apertures 21 have passed slot 26. Slot 28 is positioned to permit a strobe beam emitted therefrom, across the data reading passage, to successively pass through strobe or synchronization holes 76 (see FIGS. 6–8) which are defined in the keys 18 and described in detail below.

The upper guide member 22 has similar slots or throughbores 29, 30 and 31 defined therethrough in alignment with respective slots 26, 27 and 28. Slots 29, 30 and 31 contain respective data, end-of-key and strobe infrared detectors for receiving the beams emitted from the corresponding slots in the lower guide member 23.

Lower guide member 23 is secured within the housing, relative to a microprocessor printed circuit board 33, such that infrared sources or emitters 34, 35 and 36, which are part of the microprocessor board circuitry, fit in respective slots 26, 27 and 28. Emitters 34, 35 and 36 thus constitute the data, end-of-key and strobe sources, respectively, which emit the corresponding infrared data, end-of-key and strobe beams.

Upper guide member 22 is secured in the housing, relative to a control panel printed circuit board 37, such that infrared detectors 38, 39 and 40, which are part of the control board circuitry, fit in respective slots 29, 30 and 31. Detectors 38, 39 and 40 thus constitute the data beam detector, the end-of-key beam detector and the strobe beam detector, respectively.

Figure 3:
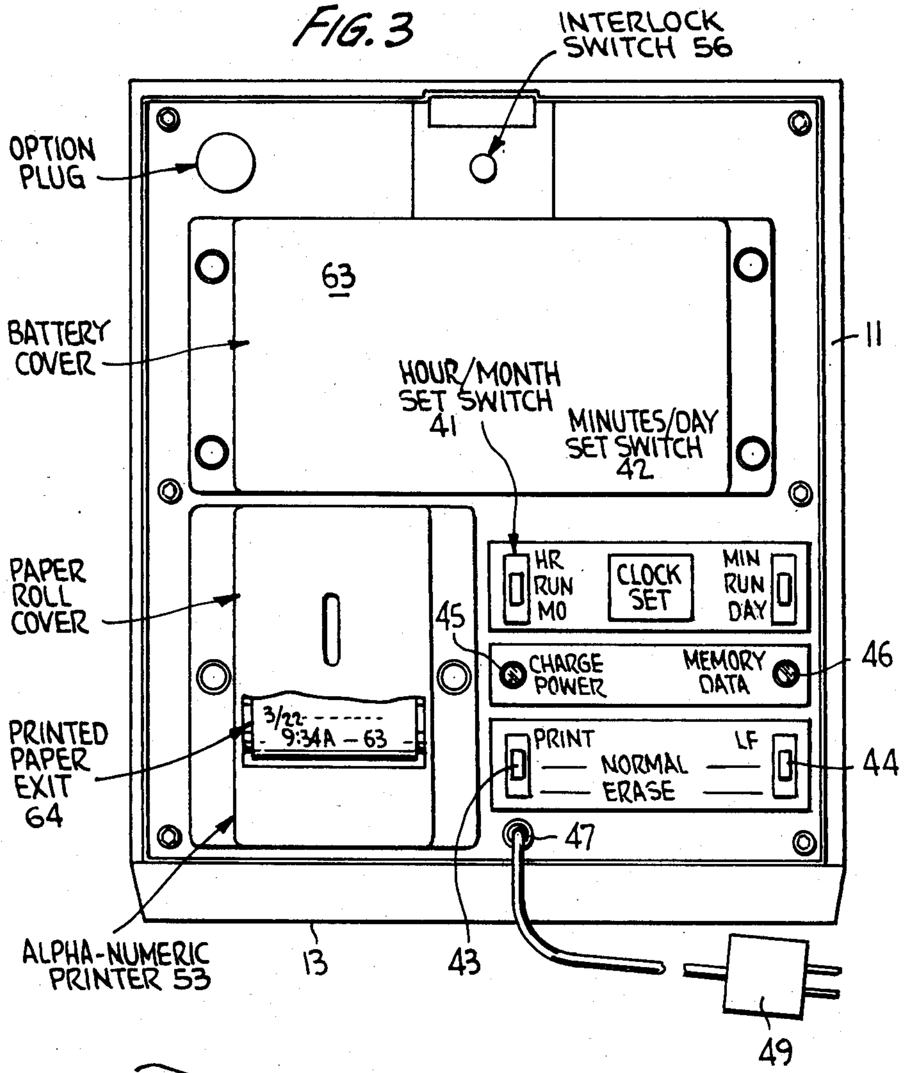
FIG. 3 is a top view in plan, partially cut away, of the data reader of FIG. 1 with its top cover unlocked and removed.

Control panel board 37 also includes four three-position switches 41, 42, 43 and 44 which can be seen in both FIGS. 2 and 3. Switches 41 and 42 are employed to set the internal time-keeping mechanism in the data reader and recorder 10. Each of these switches includes a "RUN" position to which the switches are biased and which permit the time-keeping mechanism to compute time of day and date information. The "HR" position of switch 41 and the "MIN" position of switch 42 are used to set the hour and minute parameters, respectively, of the time-keeping circuit. The "MO" position of switch 41 and the "DAY" position of switch 42 are used to set the month and day parameters, respectively, of the time-keeping circuit. Switches 43 and 44 each have a "NORMAL" position to which the switches are biased and in which these switches remain during non-use and data recording operations. Switch 43 has "PRINT" and "ERASE" positions, while switch 44 has "LF" (line feed) and "ERASE" positions, which are used during print out of stored tour information data.

Control panel board 37 also includes a "CHARGE POWER" lamp 45, and a "MEMORY DATA" lamp 46, a battery charger jack 47 and a multi-pin receptacle jack 48. Lamp 45 is energized when the internal battery is being charged by a battery charger 49 at jack 47. Charger 49 is adapted to plug into a standard 120 volts–60 Hz outlet. Lamp 46 is lit when there is tour station information data stored in the data reader memory. Jack 48 provides circuitry interconnections to multiple pin plug 50 located at the microprocessor circuit board 33.

The microprocessor board 33 also includes multiple pin jack 51 and plug 52 for interconnection to the internal printer 53, a multiple pin jack 54 for interconnection to a display printed circuit board 55, a cover interlock switch 56 which opens when cover 12 is removed from housing 11, and a switch assembly 57 including four (4) dip switches. The internal system battery 58 is connected to the microprocessor board 33 at terminals 59 and 60. The battery is typically a six volt battery rated at 1.2 amperes.

Printer 53, by way of example, may be a model MTP microthermal printer, such as is available from the Daini Seikosha Co., Ltd., of Japan. It is disposed on a stand 61 which receives electrical connections from jack 52 at the microprocessor board 33. A P-type printer cable 62 is connected to jack 51 at the microprocessor board. Printer 53 and its stand is sufficiently small and lightweight to fit efficiently within housing 11.

Referring to FIG. 3, the physical layout of certain components in housing 11 is visible when cover 12 is removed. Switches 41, 42, 43 and 44 and indicators 45 and 46 are disposed alongside printer 53. Battery charger jack 47 is seen just below the switch and indicator section. Above that section and the printer 53 is the battery, for which a coverplate 63 is visible. The interlock switch 56 is also visible above the battery coverplate. Printer 53 is shown with an alphanumeric print out 64 emerging therefrom.

Figure 4:
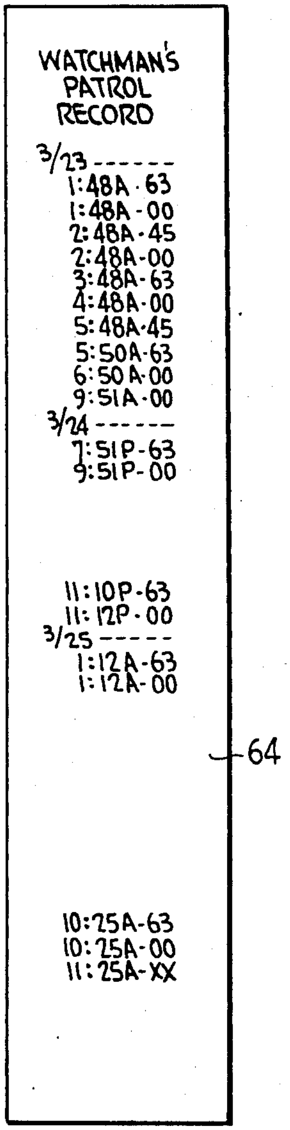
FIG. 4 is a view in plan of a typical print out provided by the internal printer disposed in the data reader housing.

A typical alphanumeric print out 64 provided by printer 53 in portable housing 11 is illustrated in FIG. 4 to which specific reference is now made. The print out 64 has an entry for the starting date (month and day) and another for each change of date (again, month and day). In between the date entries is the time of day followed by the identification number of a coded key that has been inserted into the portable reader. Thus, on March 23, key number sixty three was inserted into the reader at three-forty-eight A.M. as the fifth entry of that day. On March 24, the second entry shows that key number zero was inserted into the reader at nine-fifty-one P.M. The last entry, at eleven-twenty-five A.M. on March 25, shows that the housing 11 was opened, as indicated by the "XX" designation on the print out 64.

Figure 5:
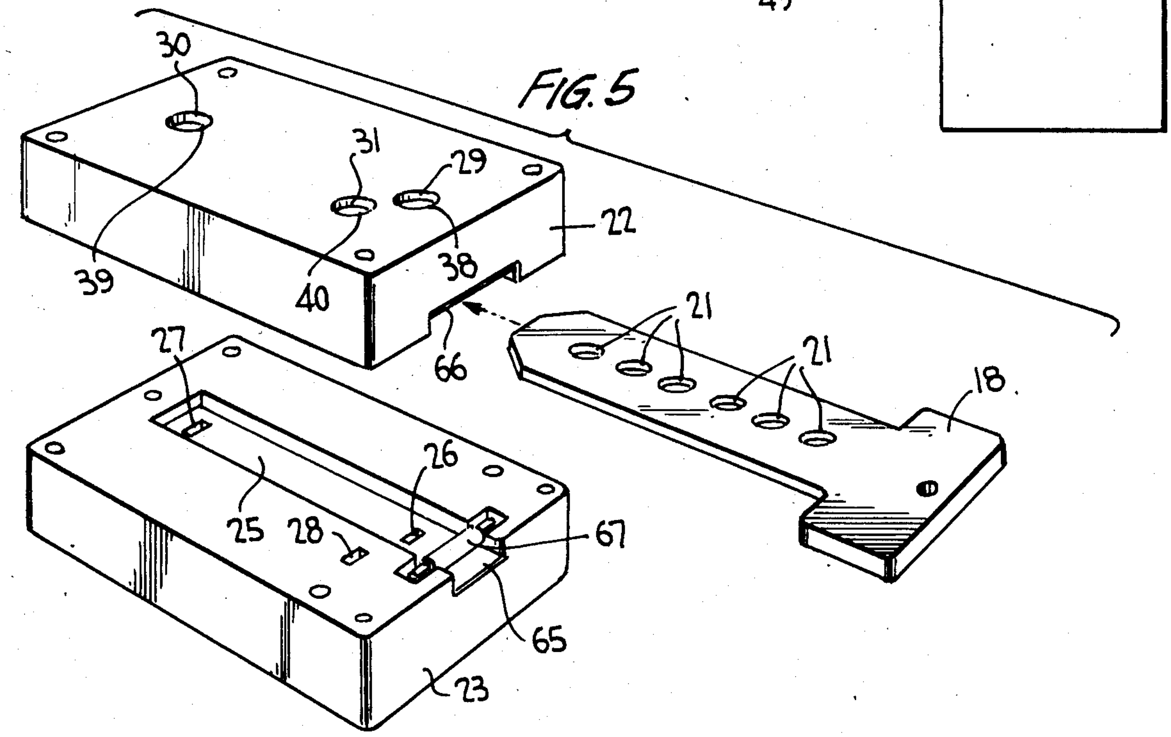
FIG. 5 is an exploded view in perspective showing the details of the key guide for the data reader in conjunction with a coded key.

Referring now to FIG. 5, the upper and lower key guide members 22 and 23, respectively, are illustrated in perspective. The opening 65 into recess 25 is seen to be considerably smaller in its transverse dimension than opening 66 into recess 24 (not visible in FIG. 5). Immediately rearward of opening 65 is a roller 67 disposed with its axis oriented transversely across recess 25. Roller 67 and its rotational mounting are spring loaded depthwise of recess 25 such that the roller normally extends to the full height or slightly beyond the recess. A similar roller (not shown) is provided across the opening 66 to recess 24, and the two rollers normally abut in a line extending longitudinally along their peripheries to block the passage formed by recesses 24 and 25. When dust cover 17 (FIG. 1) is raised and a key 18 is inserted into the data reading passage, the key forces the rollers apart against their spring bias forces, and the rollers roll along opposite surfaces of the key as the key is first inserted into the passage and then withdrawn therefrom.

The different transverse dimensions in recesses 24 and 25 are provided to match the cross-sectional configuration of key 18 which is described in greater detail below in relation to FIGS. 6–8. For present purposes, it is sufficient to note that strobe holes 76 defined through the key are longitudinally spaced in a portion of the key which is shallower than the portion in which the data bit apertures 21 are defined. It is the strobe hole portion which passes through recess 24 in upper guide 22 but not through narrow recess 25 in lower guide member 23 when the key is inserted into the data reading passage. Instead, the downward facing surface of the inserted key passes atop the upper surface of lower guide member 23 in transversely adjacent relation to recess 25. Also visible in FIG. 5 are detectors 38, 39 and 40 in slots or bores 29, 30 and 31, respectively. The sources or IR beam emitters 34, 35 and 36 are not visible in FIG. 5 but are disposed in respective slots or bores 26, 27 and 28. The end-of-key beam is issued across the data reading passage from within slot 27 at a distance from slot 26 which is at least equal to the distance between the forward end of key 18 and the middle of the last data bit aperture 21 (i.e., the aperture 21 most remote from the forward end of the key). Although the end-of-key beam and the data beam are longitudinally aligned in data reading passage 25, such alignment is not a requirement as long as the end-of-key beam is not interrupted by the key until all of the data bits in the key intercept the data beam. The orientation of the strobe beam emitted from slot 28 is such that the transverse component of the spacing between the data and strobe beams is substantially equal to the transverse spacing between the parallel strobe hole and data bit aperture arrays in key 18. The longitudinal component of the spacing between the strobe and data beams is substantially the same as the longitudinal component in the spacing between the strobe holes and data bit apertures in the key (for example, 0.15 inches).

The guide members 22 and 23 are made of moldable plastic material which is non-transmissive or opaque to infrared light. For example, material sold under the General Electric trademark as LEXAN 701 is suitable for this purpose. Appropriate mounting holes are illustrated in both guide members to permit them to be bolted together.

Figure 6:
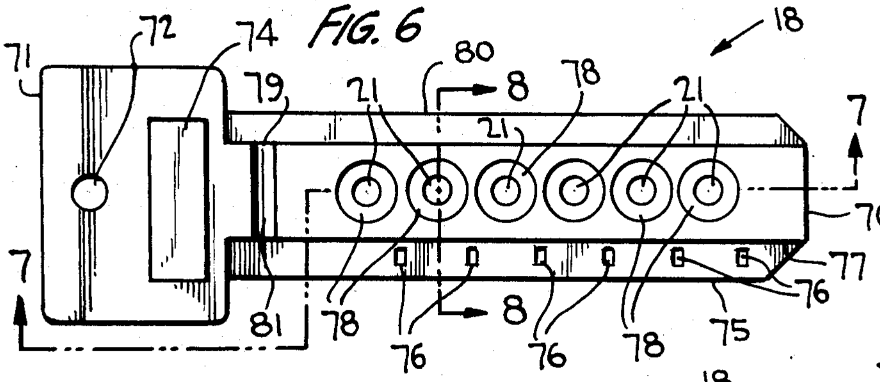
FIG. 6 is a view in plan, partially cut away, of a typical key blank employed in fabricating a coded key in accordance with the present invention.
Figure 7:
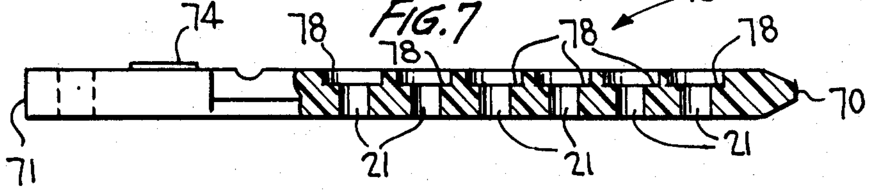
FIG. 7 is a longitudinal view in section taken along lines 7—7 of FIG. 6.
Figure 8:
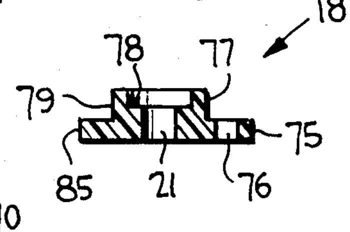
FIG. 8 is a transverse view in section taken along lines 8—8 of FIG. 6.

A typical key 18 is illustrated in detail in FIGS. 6, 7 and 8. Key 18 includes longitudinally-spaced forward and rearward ends 70 and 71, respectively. The key portion proximate the rearward end 71 is transversely enlarged and serves as a handle during insertion. A throughhole 72 is defined in this portion to permit the key to be attached to chain 19. In addition, the rearward portion may include an identification plate 74 bearing the name, number or other visible indicia representing or identifying the station at which the key is located.

The transversely narrower code section of the key has varying depth dimensions. Proximate a first longitudinally-extending transverse side 75 is a shallow depth strobe portion through which strobe or synchronization throughholes 76 are defined and oriented in longitudinally-spaced relation. Holes 76 are preferably rectangular in cross-section as illustrated, but may have other shapes for different applications. The strobe portion is separated from a data-bearing portion by a raised longitudinally-extending shoulder 77, and includes a plurality of longitudinally-spaced data bit apertures 21, there being six such apertures provided in the illustrated embodiment. The data bit apertures 21 are associated with respective strobe holes 76, with each strobe hole being spaced slightly forwardly of its associated aperture 21 to account for a similar offset of the data and strobe detector beams in the data reader. Each aperture 21 is sub-divided depthwise into two cylindrical sections of different diameter, separated by an annular shoulder 78. The cylindrical configuration of the aperture sections is not critical, and cross-section configurations of substantially any shape may be employed. Another raised shoulder 79 separates the data-bearing portions of the key from another shallow depth portion subsisting between shoulder 79 and the other longitudinally-extending transverse edge 80 of the key.

A recess 81 of arcuate cross-section (taken longitudinally of the key) extends transversely across the raised data-bearing portion of the key. This recess is adapted to match a portion of the contour of spring loaded roller 67 in recess 25 of the lower guide member so that a tactual stop indication is sensed when roller 67 enters recess 81. Recess 81 is spaced from the forward end 70 of the key to assure that the roller 67 does not enter the recess 81 unless a portion of the key intercepts the end-of-key beam, and unless all of the data bit apertures 21 have intercepted the data beam.

Key 18 is made of moldable plastic material which blocks (i.e., is opaque) to infrared light. An example of such material is LEXAN 701. By way of example only, the key may have the following dimensional characteristics: the large diameter cylindrical section of aperture 21 is typically 0.251 inches in diameter and 0.055 inches in depth; the smaller diameter aperture section is typically 0.150 inches in diameter; the centers of apertures 21 are spaced by 0.300 inches as are the centers of holes 76; holes 76 are 0.150 inches forward of their respective associated data apertures 21; the handle and data-bearing portions of the key are 0.150 inches in depth. The strobe portion is 0.050 inches in depth; holes 76 are 0.040 inches lengthwise of the key and 0.100 inches transversely of the key; the overall key length is 3.30 inches and its width is 1.10 inches at the handle and 0.70 inches between edges 75 and 80; and the data-bearing portion is 0.400 inches wide. The forward edge 70 of the key is chamfered, both transversely and depthwise, to facilitate entry of the key into the data passage of the data reader between the spring-loaded rollers.

Figure 9:
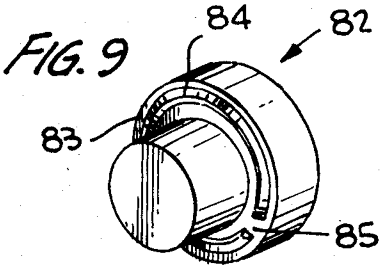
FIG. 9 is a view in perspective of a data pellet having a first binary code significance which is employed in conjunction with the key blank of FIG. 6 in forming a coded key in accordance with the present invention.
Figure 11:
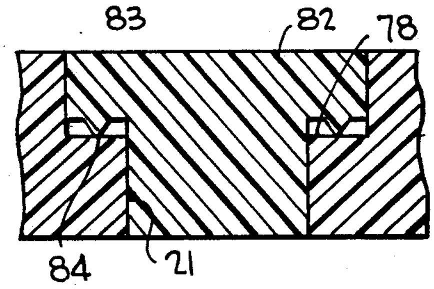
FIG. 11 is a longitudinal sectional view of the pellet of FIG. 9.
Figure 10:
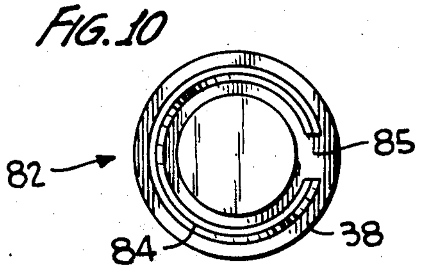
FIG. 10 is a bottom view of the pellet of FIG. 9.

The coating material employed in data bit apertures 21 is in pellet form and is illustrated in detail in FIGS. 9–14. Referring first to FIGS. 9–11, a first type of pellet 82 is configured in two cylindrical sections to match the two sections in apertures 21 in the key. The annular shoulder 83 which separates the pellet sections has a raised incomplete ring 84, the ring being incomplete by virtue of a break 85 therein. Ring 84 initially contacts shoulder 78 of data aperture 21 when the pellet 82 is inserted into the aperture. The ring serves as an energy director during ultrasonic welding of the pellet to the key in aperture 21. In addition, ring 84 serves to identify to the key assembler the coating material of which pellet 82 is made. Specifically, pellet 82 is made of material which is at least eight-five percent transmissive to infrared light. Thus, the split or incomplete energy director ring 84 identifies pellets made of infrared-transmissive material. Typically, the break 85 in ring 84 is on the order of 10°–15°.

Figure 12:
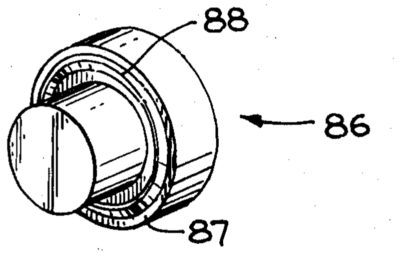
FIG. 12 is a view in perspective of a pellet having a second binary data significance and which is used in conjunction with the key blank of FIG. 6 to provide a coded data key in accordance with the present invention.
Figure 14:
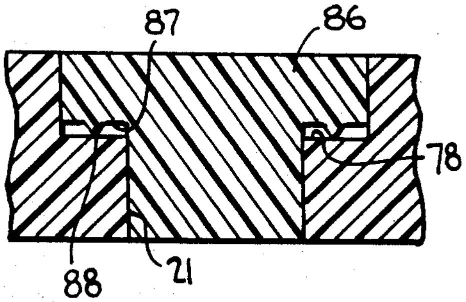
FIG. 14 is a longitudinal sectional view of the pellet of FIG. 12.
Figure 13:
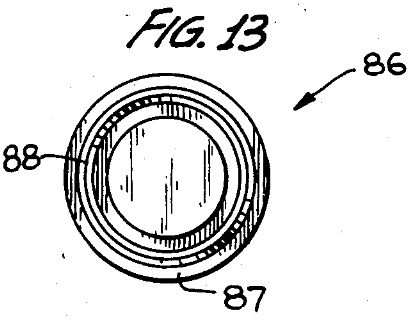
FIG. 13 is a bottom view of the pellet of FIG. 12.

Referring to FIGS. 12–14, a pellet 86 of the second type is identical to pellet 82 except that it is made of a material which passes no more than ten percent of infrared light directed at its aperture, and ring 88 on annular shoulder 87 is fully closed. Ring 88 also serves the dual functions of: (1) energy direction during ultrasonic welding of pellet 86 to the key; and (2) identifying pellets 86 which are non-transmissive of infrared light to the assembler of the coded key. Preferably, the two materials employed for pellets 82 and 86 are indistinguishable visually and tactually so that a watchman or other individual cannot discern the code from the key itself. Materials suitable for this purpose are LEXAN 21902 for IR-transmissive pellet 82, and LEXAN 701 for IR-non-transmissive pellet 86, both materials being sold by General Electric. The only visually or tactually distinguishable feature of pellets 82 and 86 are rings 84 and 88; however, these rings are hidden from view and touch in the ultrasonically welded final product.

Figure 15:
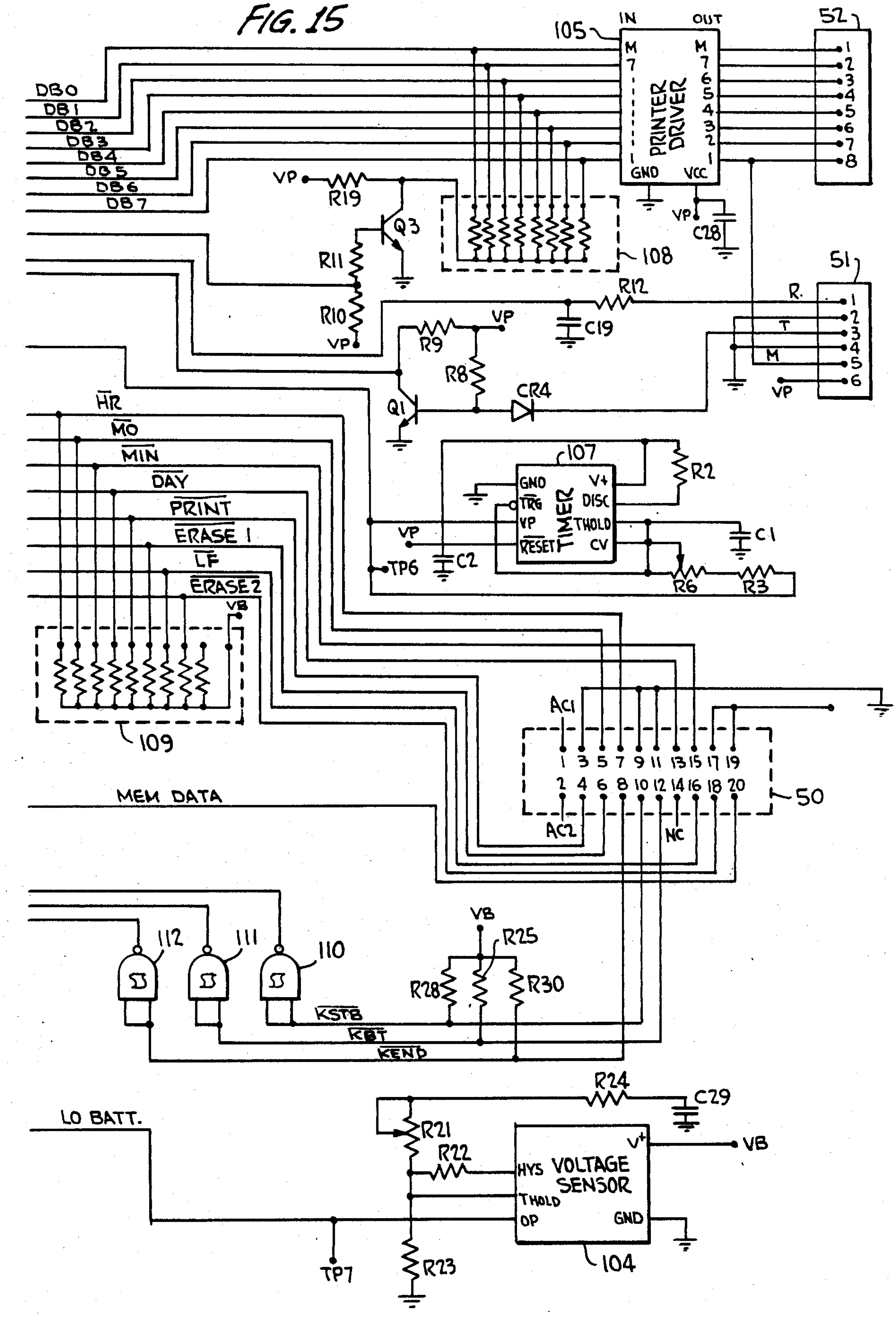
FIGS. 15, 16 and 17 are portions of an electrical schematic diagram of the microprocessor printed circuit board portion of the data reader of the present invention.
Figure 16:
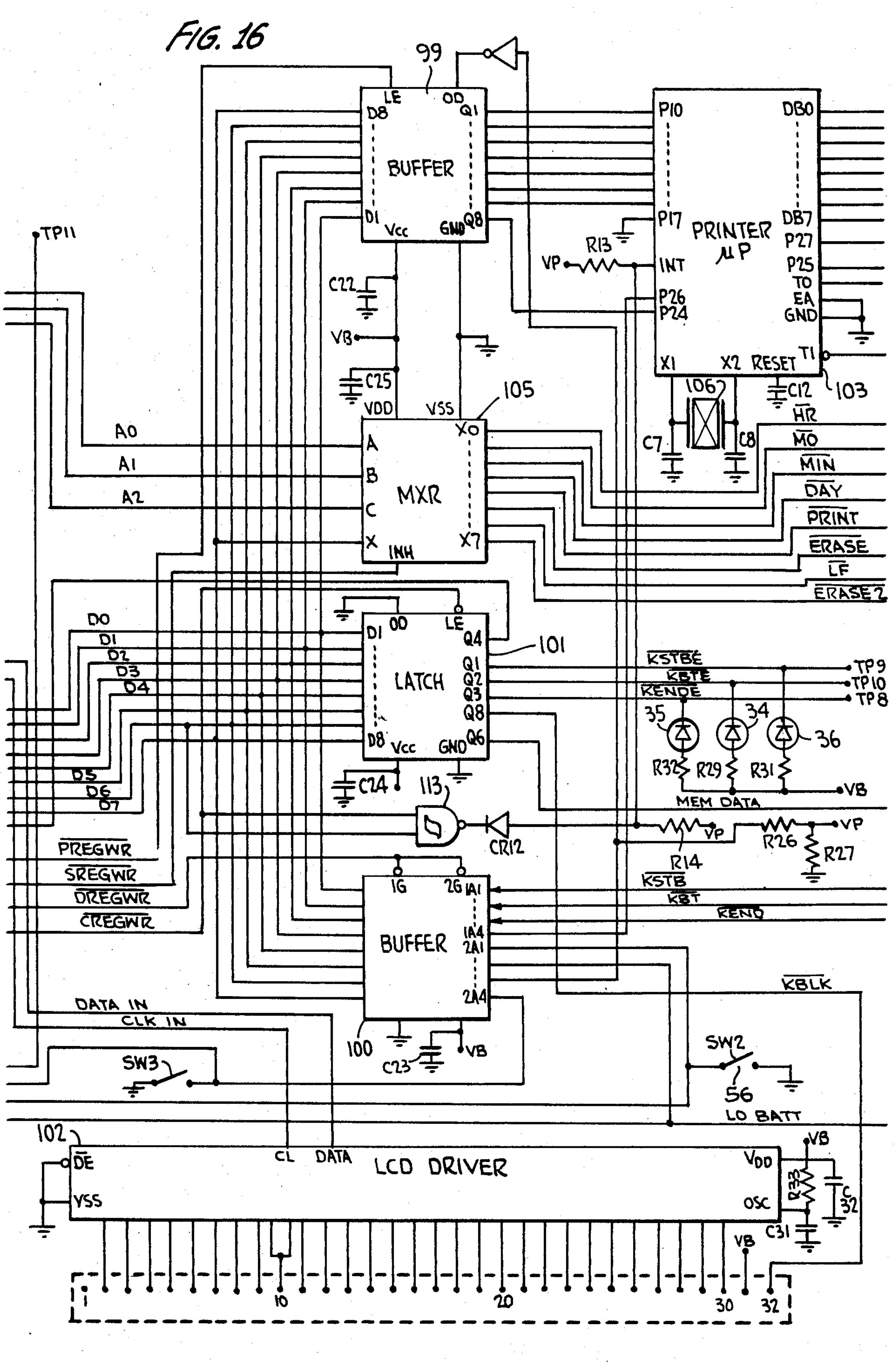
Figure 17:
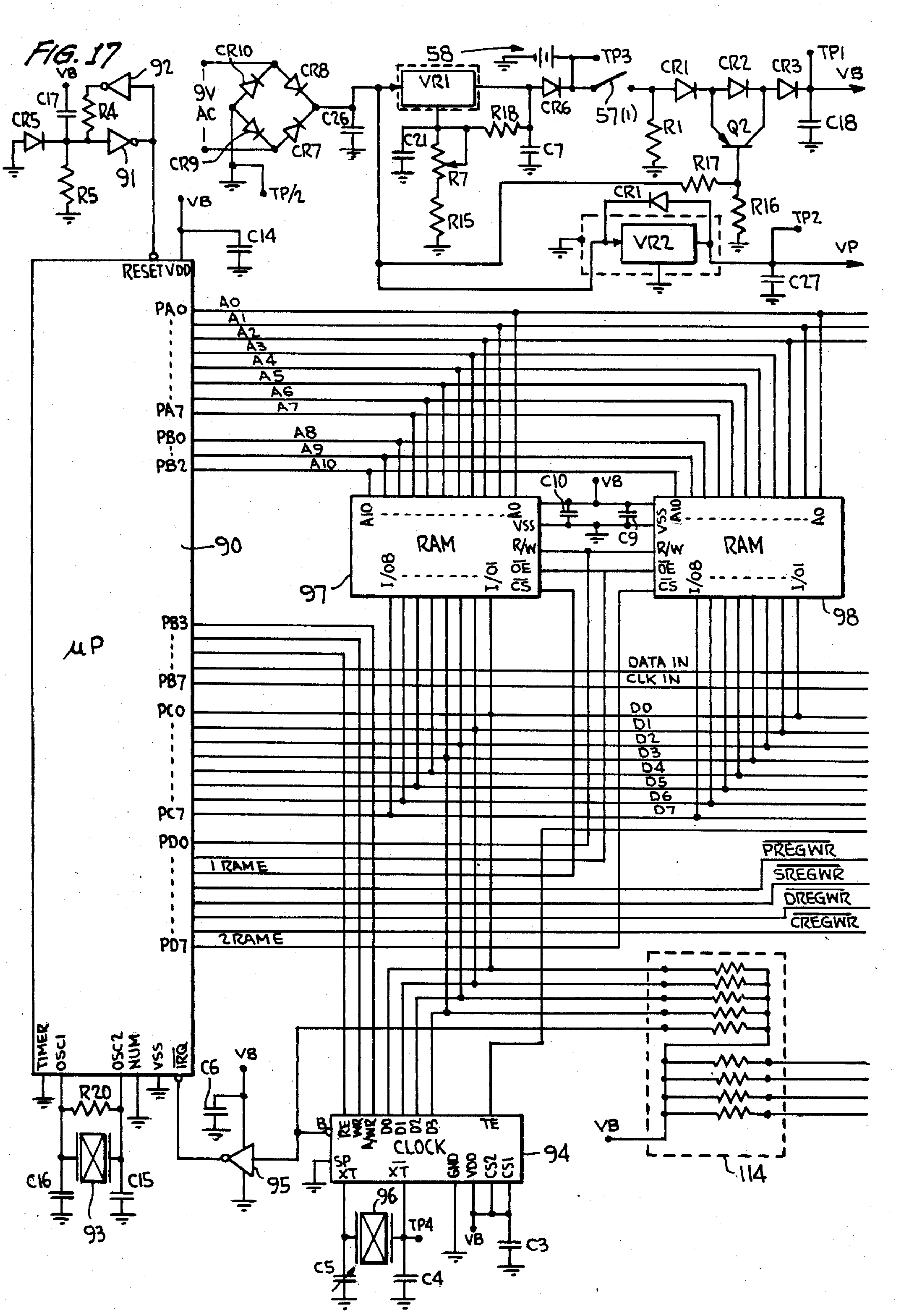

A schematic diagram of the microprocessor printed circuit board 33 is presented in FIGS. 15, 16 and 17 which, when placed adjacent one another, may be interconnected to provide a complete circuit. Specifically, the lefthand border of FIG. 15 joins the righthand border of FIG. 16; and the lefthand border of FIG. 16 joins the righthand border of FIG. 17. Referring to these figures in combination, a power supply circuit, illustrated at the top of FIG. 17, provides a battery voltage VB which powers the circuitry in the standby and data reading and record modes. In addition, the power supply circuit provides a print voltage VP which is employed during the print out of data. The VB output voltage from the power supply is shown with an arrow and is applied, without direct connection being shown, at other portions of the circuit in FIGS. 15, 16 and 17. Likewise, the VP voltage is supplied at the arrow indication in the power supply circuit and is applied at various locations without direct connection being shown. An a.c. voltage, nominally nine volts, is rectified by a full wave rectifier including diodes CR7, CR8, CR9 and CR10, the resulting positive voltage being applied across capacitor C26. This rectified voltage is applied through voltage regulator VR1 which, in the present example may be model LM317L, an adjustable three-terminal positive voltage regulator capable of supplying 100 milliamperes over a 1.2 to 37 volt output range. One source of supply for this voltage regulator is the National Semiconductor Corporation. The output terminal of regulator VR1 is resistively coupled to the adjustment terminal thereof by means of resistor R18. The adjustment terminal is also resistively coupled to ground by means of potentiometer R7 connected in series with resistor R15. These latter resistors are connected in parallel with capacitor C21. Capacitor C7 is connected from the output terminal of regulator VR1 to ground. The output voltage of regulator VR1 is applied to the anode of diode CR6, the cathode of which is connected to one pole 57(1) of dipswitch 57 as well as to the positive terminal of battery 58. When switch 57(1) is open, the output voltage from regulator VR1 charges battery 58 through diode CR6. When switch 57(1) is closed, the battery voltage passes through the switch and is applied across resistor R1 and through diode CR1 to the emitter of PNP transistor Q2. A further diode CR2 has its anode connected to the emitter of transistor Q2 and its cathode connected to the collector of that transistor. A still further diode CR3 has its anode connected to the collector of transistor Q2 and its cathode connected to the output terminal which supplies the voltage VB. A filter capacitor C18 is connected between the VB output terminal and ground. The base electrode of transistor Q2 is resistively coupled to ground by means of resistor R16. In addition, a bias voltage for the base electrode of transistor Q2 is provided through resistor R17 from the rectified voltage appearing across capacitor C26.

The print voltage VP is also derived from the rectified voltage appearing across capacitor C26. This voltage is applied to the input terminal of a voltage regulator VR2 which, in the present example, may be Model No. 7805CT which is a three terminal regulator. As employed in the present invention, the adjustment terminal of voltage regulator VR2 is connected to ground. A diode CR11 has its anode connected to the output terminal and its cathode connected to the input terminal of regulator VR2. The output signal from regulator VR2 is connected across a filter capacitor C27 to provide the voltage VP. The voltage VB is available for test purposes at test point TP1; voltage VP is available at test point TP2.

In the system described, both voltages VB and VP are nominally at five volts. The battery voltage VB is utilized during portable operation, such as during a tour of security stations. The print voltage VP, as the name implies, is employed during print out of the data. The battery voltage VB powers only the low-power CMOS circuitry and display 15. The VP voltage is provided by 120 volts a.c. available from common wall outlets, and drives the circuitry related to the print out operation.

A main or primary microprocessor 90, by means of example in the present system, may be the model MC146805G2 such as that sold by the Motorola Semiconductor Products, Inc. This unit is an eight-bit microcomputer unit which contains an on-chip oscillator, a central processing unit, a random access memory, a read only memory, an input/output circuit and a timer. Microprocessor 90 is activated when switch 57(1) is turned on to provide the battery voltage VB, as illustrated in the upper lefthand corner of FIG. 17. This voltage is applied through capacitor C17 and inverter 91 to the reset terminal of the microprocessor. The reset terminal is also connected to inverter 92 connected in series with resistance R4, the combination being connected in inverse parallel relation with inverter 91. The input terminal to inverter 91 is also connected across resistor R5 to ground, and to the cathode of diode CR5, the anode of which is connected to ground. Inverters 91 and 92 may, for example, be model CD4049 hex inverting buffers of the type sold by National Semiconductor Corporation. These inverting buffers feature logic level conversion using only one supply voltage which can vary over a wide supply voltage range of 3.0–15 volts. The battery voltage VB is also applied across capacitor C14 to the $V_{DD}$ terminal of microprocessor 90.

The oscillator terminals of microprocessor 90, as illustrated in the lower lefthand corner of FIG. 17, have a crystal oscillator 93 connected thereacross in parallel with resistor R20. Capacitor C15 and C16 are connected between respective oscillator terminals and ground. The timer and NUM terminals of the microprocessor are both grounded, as is the $V_{SS}$ terminal.

The interrupt request signal applied to terminal $\overline{IRQ}$ is derived from clock 94 through inverter 95. Inverter 95 may be of the same general type as inverters 91 and 92. The clock circuit 94 may be a model MSM 58321RS real time clock/calendar of the type manufactured by the OKI Company. Clock 94 provides signals representing seconds, minutes, hours, day-of-the-week, date, month, year, and has a twelve/twenty-four hour time selection. A precise 32.768 KHz oscillator 96 is connected across its crystal terminals. Opposite sides of crystal 96 are capacitively coupled to ground through variable capacitor C5 and capacitor C4, respectively. This crystal 96 serves as the precise time base for clock circuit 94 so that the clock may internally develop the time and date data required by the system.

When the battery voltage is applied to microprocessor 90, its program resets to its initial state and begins operating according to the internal (firmware) program. Address lines A0–A10 select the memory locations in random access memory (RAM) units 97 and 98 at which data is to be stored or from which data is to be retrieved. The D0–D7 lines correspond to an eight-bit bi-directional data bus between microprocessor 90 and RAMs 97, 98, buffer 99 (top of FIG. 16), buffer 100 (lower portion of FIG. 16) and latch 101 (middle portion of FIG. 16). Buffer 99 and latch 101 may, in the present system, comprise model MM74C373 tri-state octal D-type latches. These latches are eight-bit storage elements with tri-state outputs which have been designed to drive highly capacitive loads. When a high level is applied to the output disable input OD, all output levels go to a high impedance state, regardless of the nature of signals present at the other inputs and the state of the storage elements. When the latch enable $\overline{LE}$ signal is high, all of the Q outputs follow the corresponding D inputs. When $\overline{LE}$ is low, data at the D inputs are retained at the outputs until the $\overline{LE}$ returns high again. Latch 101 may be a model MM74C244 non-inverting octal buffer and line driver with tri-state outputs which, like the MM74C373 unit, is available from the National Semiconductor Company. The MM74C244 latch operates in a similar manner to the operation described for the MM74C373 units.

High speed data passes directly between the microprocessor 90 and units 97, 98, 99, 100 and 101, back and forth on the data bus D0–D8. Data bits D0–D3 also load or unload time data with respect to clock 94 under firmware control at the microprocessor. The signals CLK IN and DATA IN are provided by the microprocessor to the driver circuit 102 (at the bottom of FIG. 16) for the liquid crystal display unit 15. Driver 102 may be a model MM5452 LCD display controller having a serial input and capable of driving 32 display segments. This driver provides the exact waveform, by means of an internal oscillator, required to control the liquid crystal display 15.

The latch circuit 101 functions to buffer the data bus D0–D8 and drive control functions such as the infrared emitters 34, 35 and 36. Specifically, the Q2 output terminal from latch 101 provides the $\overline{KBTE}$ signal for energizing the data emitter 34. The Q1 output signal from latch 101 is the $\overline{KSTBE}$ signal which activates the strobe emitter 36. The Q3 output signal from latch 101 is the $\overline{KENDE}$ signal for activating the end-of-key emitter 35. Specifically, these signals go low to activate their respective emitters which receive the battery voltage VB through the respective resistors R29, R31, and R32. In addition, latch 101 provides its Q8 output signal $\overline{KBLK}$ to actuate indicator 16 at the front panel of data reader and recorder 10 when data from an inserted key has been read and accepted as valid. The Q6 output signal from latch 101 is connected to the test TE pin at clock 94, and the Q4 output signal from latch 101 activates the memory data indicator 46 via connector 50 at the righthand side of FIG. 15. Latch 101 is enabled at its $\overline{LE}$ terminal by the $\overline{CREGWR}$ (C register write) signal at the PD6 terminal of microprocessor 90.

The bus receiver buffer 100 functions to read the detected infrared signals KSTB, and KEND derived from detectors 40, 38 and 39, respectively. These signals are received at the 1A1, 1A2 and 1A3 terminals, respectively, of buffer 100. The signal at terminal 1A4 is employed to control the ready signal applied to the printer microprocessor 103 located in the upper righthand corner of FIG. 16. In addition, the interlock switch SW2, which corresponds to switch 56 illustrated in FIG. 3, has its state monitored at terminal 2A1 of buffer 100. Terminal 2A2 receives the LO BATT signal from voltage sensor 104 in the lower righthand corner of FIG. 15 whenever the battery voltage VB falls below a predetermined level. Voltage sensor 104 may be a model ICL8211 programmable voltage reference made by Intersil. This regulator consists of an accurate voltage reference, a comparator and a pair of output buffer/drivers. An output signal is provided at its OP terminal whenever the voltage falls below a predetermined level as set by the external components including variable resistor R21, resistors R22, R23 and R24, and capacitor C29.

The print voltage VP is applied through resistor R26 and across resistor R27 to the 2A3 terminal of buffer 100. The 2A4 terminal of that buffer is selectively connected to ground by means of switch SW3 which selects the twelve or twenty-four hour clock operation at clock 94. Buffer 100 is enabled by the $\overline{DREGWR}$ signal from the PD5 terminal of microprocessor 90.

A multiplexer 105 (located in approximately the middle of FIG. 16) receives the address bits A0, A1 and A2 and data bus bit D7 from the microprocessor. Multiplexer 105 may take the form of the model CD4051B single eight-channel analog multiplexer/demultiplexer sold by National Semiconductor Corporation. This unit is a digitally controlled analog switch having three binary control input signals A0, A1 and A2 and an inhibit input derived from the $\overline{SREGWR}$ (S register write) signal appearing at the PD4 terminal of microprocessor 90. The three binary signals A0, A1 and A2 select one of eight channels X0–X7 to be applied to the X terminal of multiplexer 105 which is connected to the D7 data bus line. The multiplexer 105 is basically scanned by the microprocessor address bus A0, A1 and A2 to monitor the control panel switches via lines $\overline{HR}$, $\overline{MO}$, $\overline{MIN}$, $\overline{DAY}$, $\overline{PRINT}$, $\overline{ERASE1}$, $\overline{LF}$, and $\overline{ERASE}$ 2. A ground closure appearing on any one of these signal lines is transferred to the microprocessor via data bus line 7.

Buffer 99 provides the seven character bits for driving the printer microprocessor 103. The printer microprocessor is preferably a model μPD8049 single chip eight-bit microcomputer such as manufactured and sold by NEC Electronics (USA) Inc. This unit is a high performance single component eight-bit parallel microcomputer using N-channel silicon gate MOS technology. It is particularly suited to control printer 53 through printer driver 105. Printer driver 105 may take the form of model LB1256 printer driver such as is available from the National Semiconductor Corporation. Buffer 99 provides the seven character bits for printer microprocessor 103 on its output lines Q1–Q7, applied to input bits P10–P17 at microprocessor 103. The output bit Q8 from buffer 99 is applied to the P24 terminal of microprocessor 103 as a reset control. Timing for the printer microprocessor 103 is derived from timer 107 (FIG. 15) which establishes a nominal 15 KHz clock frequency in its output signal (terminal OP) which is applied to the T1 terminal of microprocessor 103. This signal sets the "PRINT" intensity. By varying resistor R6 at the CV terminal of timer 107, the darkness of the print may be established. The printer driver 105 drives the seven dots in the print head which form the thermal pattern. The OUT 1 line from printer driver 105 is applied through connector 51 to the printer cable (as illustrated in FIG. 2) and constitutes the motor drive signal for the printer. The output signal from terminal P25 of microprocessor 103 is applied across capacitor C19 and through resistor R12 as signal R and constitutes the "HOME" signal for the printer. The TO signal from microprocessor 103 is applied across capacitor C11 and the collector emitter circuit of NPN transistor Q1. The collector of transistor Q1 is connected through resistor R9 to the print voltage VP. The base of transistor Q1 is connected through resistor R8 to the print voltage VP. The emitter of transistor Q1 is grounded. The base of transistor Q1 is also connected to the anode of diode CR4, the cathode of which provides the printer tach signal T at connector 51. The data signals for the printer are provided at connector 52, while the control signals for the printer are provided at connector 51.

A further NPN transistor Q3 has the print voltage VP applied to its base through series-connected resistors R10 and R11. A control voltage is applied to the base of transistor Q3 at the junction of resistors R10 and R11 and is derived from output terminal P27 of microprocessor 103. The emitter of transistor Q3 is grounded while the collector is connected to resistor R19 and to the various resistors in parallel in resistor panel 108. Resistor R19 is connected to the print voltage VP. The individual resistors in resistor panel 108 are connected to respective data output lines DB0–DB7 from microprocessor 103. Transistor Q3 thereby serves to control the impedance on all of the DB0–DB7 data lines under the control of the signal appearing at terminal P27 of the printer microprocessor 103.

A further resistor panel 109 has each of its individual resistors connected at one side to a respective input signal line for multiplexer 105. The other side of all of the resistors in resistor panel 109 is connected to the battery voltage VB.

The individual $\overline{KSTB}$, $\overline{KBT}$ and $\overline{KEND}$ signals are derived from respective Scmitt trigger circuits 110, 111 and 112 which are triggered by the $\overline{KSTB}$, $\overline{KBT}$ AND $\overline{KEND}$ signals from the detectors 40, 38 and 39, respectively. The Scmitt triggers 110, 111 and 112 may be model CD4093B Schmitt triggers such as sold by the National Semiconductor Corporation. A further Schmitt trigger 113 (illustrated between latch 101 and buffer 100 in FIG. 16) receives the bit D6 from the data bus and the signal $\overline{CREGWR}$ from microprocessor 90 and serves to control the interrupt terminal at printer microprocessor 103. The interrupt terminal at the printer microprocessor is connected to the print voltage VP to a resistive coupling R13, and to the anode of diode CR12. The cathode of that diode is connected to the output terminal of Schmit trigger 113. In addition, the print voltage VP is connected through resistor R14 to both the anode of diode CR12 and the interrupt terminal of the printer microprocessor 103.

By way of example only, the individual passive components illustrated in the schematic diagram of FIGS. 15, 16 and 17, may take the values set forth in the following table:

| COMPONENT | VALUE |
|---|---|
| Resistors | (in ohms) |
| R1, R3, R26, R14 | 47K |
| R2, R10, R11, R13, R17, R25, R27, R28, R30 | 10K |
| R4 | 1.5 M |
| R5 | 220K |
| R6 | 50K |
| R7, R12 | 1K |
| R8, R9 | 180K |
| R20 | 10 M |
| R15, R29, R31, R32 | 330 |
| R16, R19, R21, R23 | 100K |
| R18 | 240 |
| R22 | 4.7 M |
| R23 | 330K |
| Resistor Pad 108 | 10K |
| Resistor Pad 109 | 22K |
| Resistor Pad 114 | 47K |
| Capacitors | (in microfarads) |
| C1, C31 | .001 |
| C2, C3, C6, C9, C10, C13, C14, C19, C22-C25, C29, C32 | .01 |
| C4, C7, C8, C15, C16 | 33 picofarad |
| C5 | 10-60 |
| C12, C17, C21 | 1.0 |
| C18 | 100 |
| C26 | 2200 |
| C27 | 4700 |
| Diodes | |
| All diodes | IN4003 |
| Transistors | |
| Q1, Q3 | 2N4401 |
| Q2 | 2N4403 |

The random access memories 97 and 98 may be model MP6116 static RAM units sold by Micropower Systems. These RAM units 97 and 98 serve as storage units for data in conjunction with microprocessor 90 and are controlled by the 1 RAM E and 2 RAM E signals, respectively, appearing on the PD2 and PD7 lines of microprocessor 90. The infrared emitters 34, 35 and 36 may be model XC-880 infrared emitters which provide infrared beams at a wavelength of 880 nanometers. The infrared detectors 38, 39 and 40 may be model XC-500 phototransistors which, like the XC-880, is sold by National Semiconductor Corporation.

Figure 18:
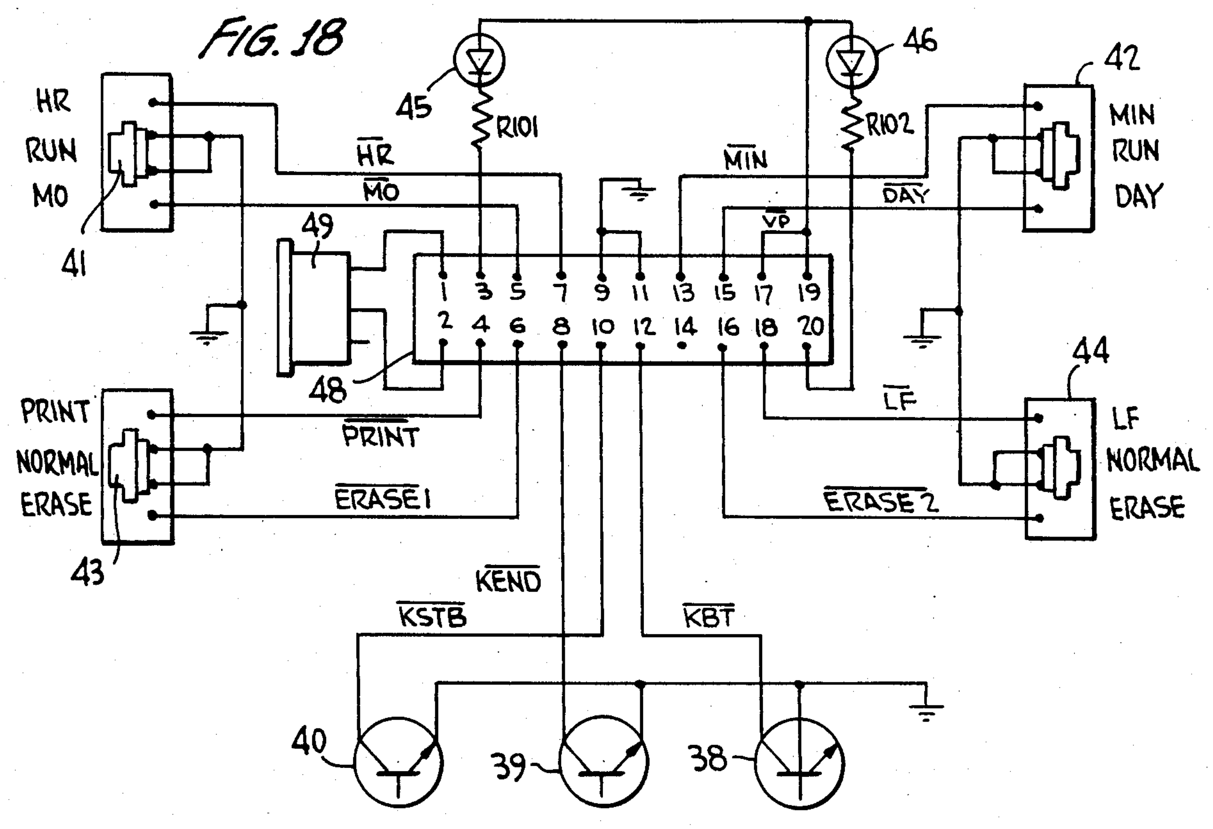
FIG. 18 is an electrical schematic diagram of the control printed circuit board portion of the data reader of the present invention.

Specific reference is now made to FIG. 18 in which a schematic diagram of the control board 37 (FIG. 2) is illustrated in detail. Connector 48 has its pins 1-20 connected to correspondingly numbered pins of connector 50 in the microprocessor schematic in FIG. 15. Pins 1 and 2 of connector 48 receive the a.c. voltage from adapter 49. This a.c. voltage is shown as AC1 and AC2 at connector 50 in FIG. 15. This symbolic representation is intended to illustrate that the same a.c. voltage is applied across the full wave bridge rectifiers CR7, CR8, CR9 and CR10 at the top of FIG. 17. The circuit diagram in FIG. 18 primarily illustrates how each of the switches 41, 42, 43 and 44, and each of the detectors 38, 39 and 40 provide the various signals which are employed in the circuit in FIGS. 15, 16 and 17. In addition, the indicators 45 and 46 are illustrated in FIG. 18 and are connected to the print voltage VP at one end and through respective resistors R101 and R102 to the circuitry in FIGS. 15, 16 and 17 at the other end.

Figure 19:
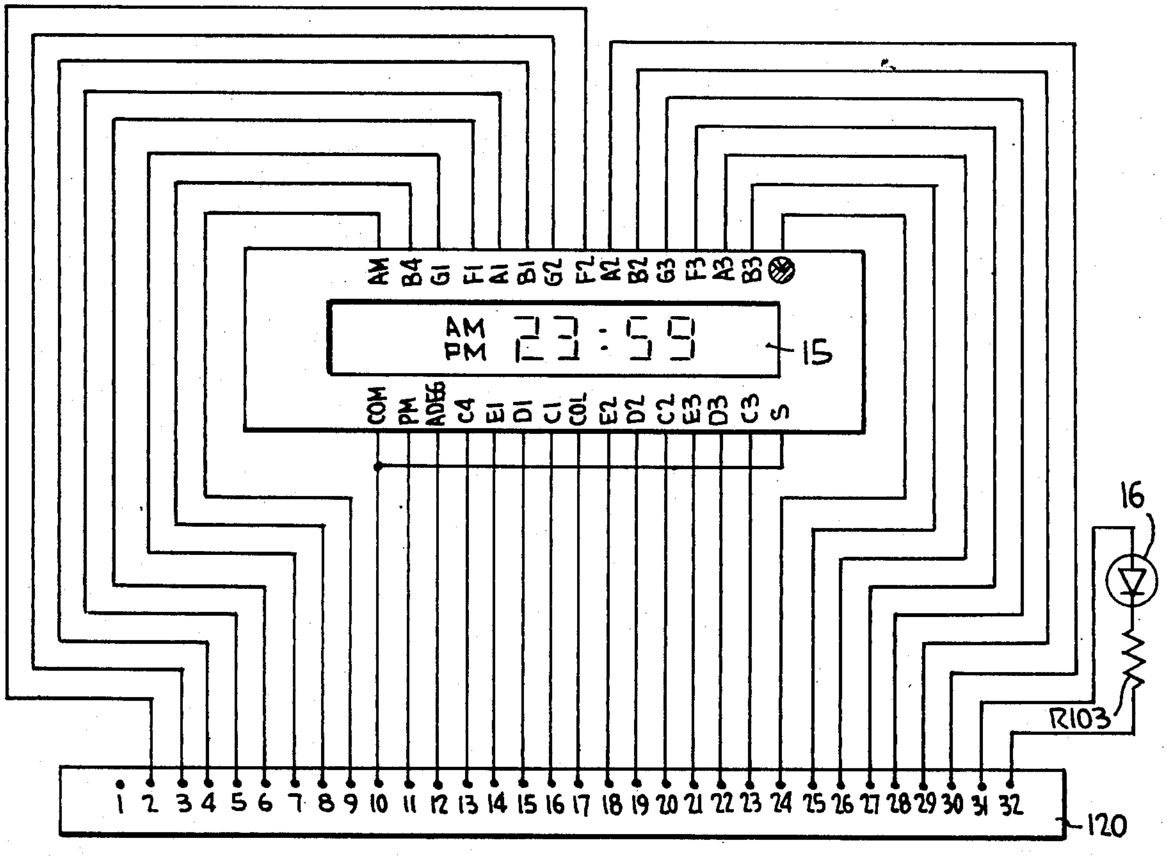
FIG. 19 is an electrical schematic diagram of the display printed circuit board of the data reader of the present invention.

Referring to FIG. 19, the circuit arrangement for the display board 55 is illustrated in detail. The various pin connections for the display board connector 120 have corresponding connections to the driver circuit 102 at the bottom of FIG. 16. The particular display employed in the preferred embodiment of the present invention is model number LCD 412-11 manufactured by Sanyo. All of the various connections to the display unit 15 are correspondingly connected to various pins on connector 120. Also illustrated in FIG. 19 is the indicator 16 on the front panel of the display unit. And it is shown connected in series with resistor 103 which serves a voltage-dropping function.

Resistors R101 and R102 in FIG. 18 may, by way of example, be 470 ohms. Resistor R103 in FIG. 19 may, for example, by 680 ohms.

The flow charts in FIGS. 20-25 correspond to the software employed in conjunction with the microprocessor 90 in FIG. 17. The following paragraphs comprise a description of the various operating modes of the present invention with reference to these flow charts.

Figure 20:
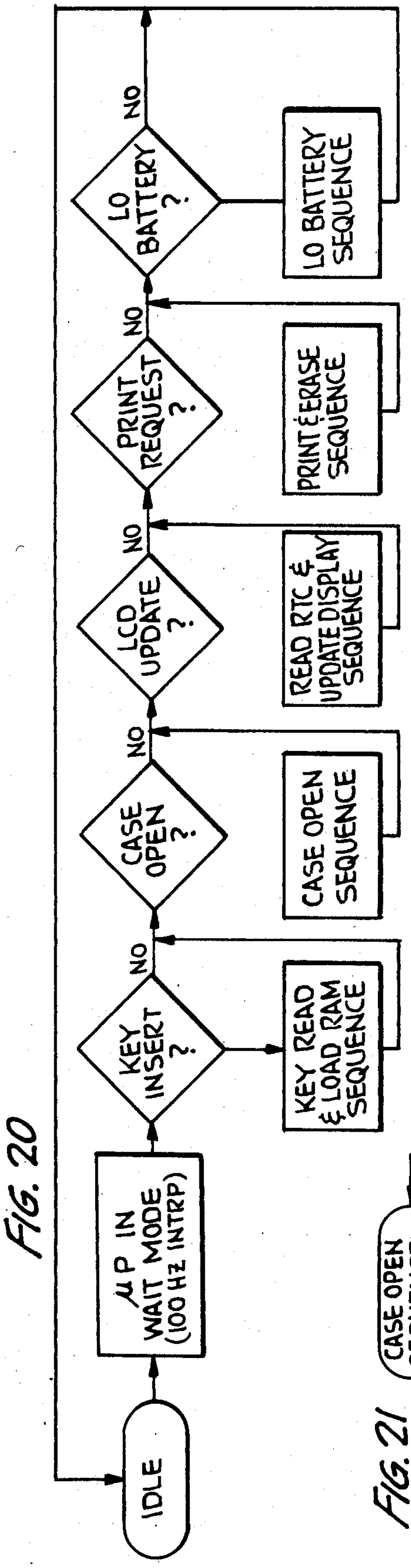
Figure 21:
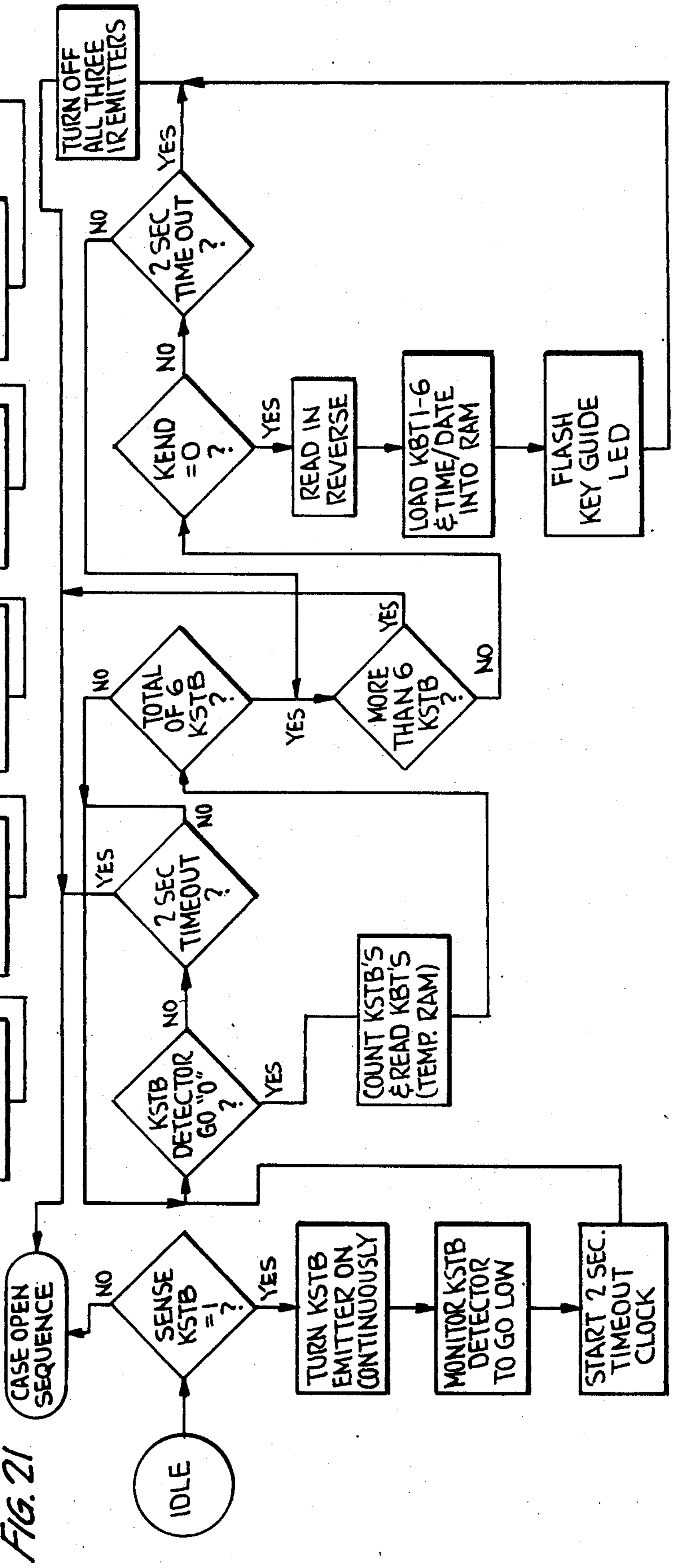

The main operating sequence flow chart is illustrated in FIG. 20. Upon activation of the battery voltage VB, the system goes into an idle state which corresponds to a standby mode. In this mode, the system waits for a data key insertion into the data reader and recorder 10. The microprocessor provides data on data bus D0-D7, under the control of the $\overline{\text{CREGWR}}$ signal at latch 101 to bring the $\overline{\text{KSTBE}}$ signal low every six milliseconds for an interval of approximately two hundred microseconds. This causes the strobe infrared beam emitter 36 to pulse on and off every six milliseconds at a duty cycle of approximately five percent. This low power level, resulting from the low duty cycle, provides a negligible drain for the battery voltage. The pulsing of the strobe beam from source 36 is employed to detect entry of a key into the data reading passage. The highest priority interrupt for the program is the insertion of a key into the data reading passage which initiates the key insert subroutine illustrated in FIG. 21. If one of the strobe beam pulses is interrupted by an entered key, the $\overline{\text{KSTB}}$ signal is applied via buffer 100 to the microprocessor. Specifically, if the pulse from Schmitt trigger 110 is not received, the microprocessor determines that the strobe beam has been interrupted. When this occurs, the microprocessor activates all three beam emitters 34, 35 and 36 so that the beams are on continuously. This initiates a read mode during which each of the detectors 38, 39 and 40 are monitored to determine when a beam is interrupted. In addition, a two second time-out clock interval is initiated internally in the microprocessor 90. In other words, the microprocessor only allows approximately two seconds for the read mode. Interruptions in the strobe, data or end-of-key beams are reflected by a change of state at detectors 40, 38 and 39 (FIG. 18) which trigger respective Schmitt trigger circuits 110, 111 and 112 (FIG. 15) the two second time interval sets a maximum time in which a valid read operation of a key can be performed. If the key strobe detector 40 does not detect a strobe pulse through one of strobe holes 76 before the two second time-out, the system proceeds to the case open sub-routine. If a strobe pulse is detected, the strobe pulses are counted with the count being stored in RAMs 97 and 98. With each strobe pulse count, the corresponding data bit in aperture 21 of the coded key is read in accordance with the infrared transmissivity characteristic of the material in aperture 21. In other words, every time a key strobe is counted, the appropriate data bit is read. When the strobe pulse count reaches six, and if the two second time-out interval has not expired, the microprocessor looks for an end-of-key detection in the form of a pulse from Schmitt trigger 112 in FIG. 15. If more than six key strobe pulses are received before the end of the key is detected, it is an indication that the user has only partially inserted the key and has then withdrawn it, or has continued to move the key in and out without fully inserting it. Under such circumstances the sub-routine is terminated. When the end of key condition is detected, the sequence is reversed so that the strobe pulses are sensed and corresponding data bits are read while the key is withdrawn. Upon reading six data bits during insertion and six data bits during withdrawal of the key, the data bits are compared. If they match, the indicator 16 at the front panel is indicated and all three of the beam emitters are de-energized. The system then leaves the read mode sequence. Of course, if the two second time-out interval expires before a valid comparison of insertion and withdrawal data is made, the key read sequence is also terminated. Any termination of the key read sequence or, if there is no interruption of the pulsing strobe beam to begin with, permits the program to proceed to the case open sub-routine. It should be noted that the two second time-out interval is selected as a matter of choice for the present system. It is felt that a key can be properly inserted and withdrawn quite easily by a watchman within that time interval. It is possible, however, to provide a time-out interval of different duration.

Figure 24:
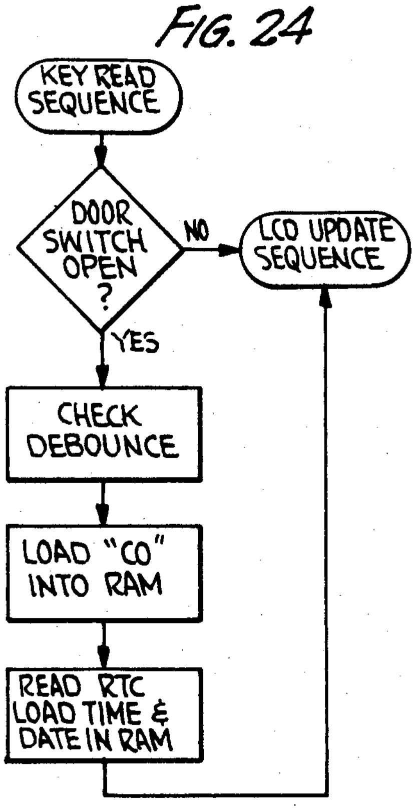
Figure 25:
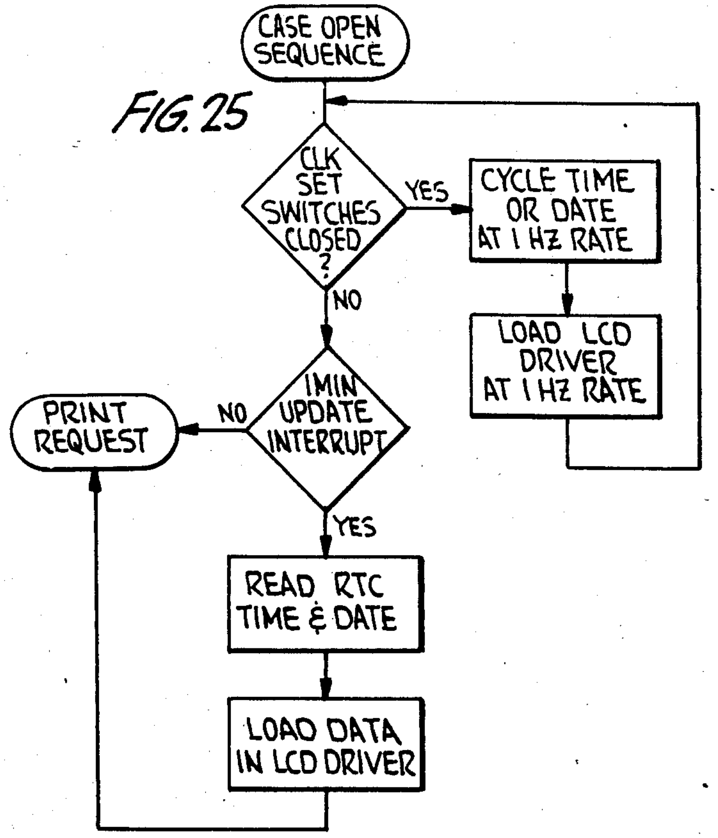

Referring back to FIG. 20, upon completion of, or failure to enter, the key insert sub-routine, the program enters the case open sub-routine, the flow chart for which is illustrated in FIG. 24. Basically, in this sub-routine the system looks to determine whether or not the interlock switch 56 for cover 12 is open. When switch 56 is open, terminal 2A1 at buffer 100 is removed from ground. If the switch is closed, that terminal is grounded. In either case, the status of the interlock switch 56 is reflected on the data bus D0–D7 when buffer is strobed by the $\overline{\text{CREGWR}}$ signal. If the switch is not open, the system proceeds to the next priority sub-routine (i.e., the LCD update sequence). If the switch is open, the program detects whether or not it was a de-bounce; that is, the status of the switch is checked a few times to make sure that the bounce noise has been eliminated and, if it has, the case open signal is loaded into the RAM memory 97, 98. If this occurs, the symbol "XX" is loaded into the memory for subsequent print out on the hardcopy 64 in the print mode. The real time clock (RTC) is then read at clock 94 so that the time of occurence of the case open condition can also be stored for subsequent print out. This time data is placed on data bus lines D0–D3 by clock 94. Thus, the "XX" character and the corresponding time of occurence are stored together for subsequent print out. The system then exits from the case open sequence and proceeds to the LCD update sequence which is illustrated in detail in FIG. 25. In the LCD update sequence, the display is updated. The system looks to see if the clock set switches 41 and 42 are closed (or actuated). If the switches are not closed, a determination is made as to whether or not a one minute update interrupt procedure is in process. If not, the sub-routine exits and proceeds on to the print request sub-routine. The B signal emanating from the left side of clock 94 in FIG. 17 provides an accurate pulse marking one second intervals. These pulses are applied to microprocessor 90 at the $\overline{\text{IRQ}}$ terminal in order to time interrupt requests. In the interrupt mode the microprocessor effectively reads the clock. The actual update or change of the display is made after sixty of the one second pulses are received; however, the interrupt mode occurs once each second. The processor continues the sub-routine by addressing the clock and requesting the present time. The time data is provided on data bits D0–D3. The clock is commanded in this operation at its RE terminal. In effect, the microprocessor asks the time of the clock 94 and the clock responds by placing the time data on bits D0–D3. This data is loaded into the LCD driver 102 in serial form by means of the DATA IN and CLK IN signals. In other words, the microprocessor 90 re-organizes the data received in parallel form on bits D0–D3 and converts it to a serial pattern at output terminal PB6. This data is in suitable form for the multiple segments of the display 15. Each segment of serial data is appropriately clocked by the CLK IN signal to synchronize entry into the LCD driver 102.

If, during the LCD update sequence, one of switches 41 or 42 is being closed (which means somebody is trying to set the time) then the processor increments the time at clock 94 every second. This increment continues until the switch is manually released at which point the clock continues from its now set position. Both the time and the date are set in the same manner.

The program is arranged to provide the time for eight seconds out of every ten at the LCD display 15. The other two seconds are used to display the date. Thus, the display alternately indicates the time and date in a periodic fashion.

Figure 22:
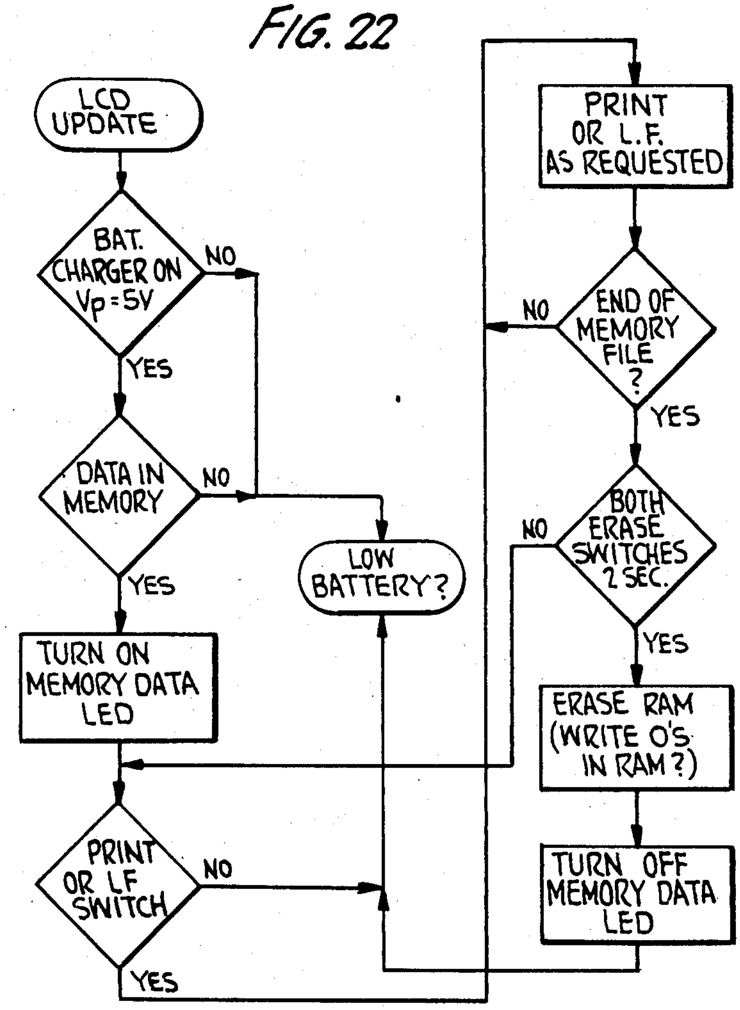

The next sequence in the program is the print request sequence, the flow chart for which is illustrated in FIG. 22. The first decision made in this sequence is whether or not the battery charger has been plugged into the unit at jack 47. This is determined by whether or not the print voltage VP is present at terminal 2A3 of buffer 100 in FIG. 16. If the charger is not plugged in, the program proceeds to the next sequence which is the low battery sub-routine. On the other hand, if the print voltage VP is detected, a determination is made as to whether or not there is data in the memory. If there is not data in the memory, the print request sequence terminates and the program proceeds to the low battery sequence. On the other hand, if there is data stored in the RAM 97, 98 memory, the memory data indicator 46 is energized. The signal for energizing indicator 46 is the MEM DATA signal derived from output bit Q6 of latch 101. The decision is then made as to whether or not the switches 43 or 44 are actuated. If neither of these switches are actuated the program proceeds to the low battery sequence. If one of the switches 43 and 44 is being actuated, this condition is detected at multiplexer 105, the eight input signals of which are being sampled at high speed by the microprocessor. If either switch is actuated the printer is commanded to print or execute a line feed operation, depending upon which switch is actuated. For example, if switch 43 is being actuated to the PRINT position the low level $\overline{\text{PRINT}}$ signal is detected at multiplexer 105 and applied via the data bus bit D7 to the microprocessor. The microprocessor responds by reading the data in memories 97, 98 and providing the data on data bus D0–D7 to the printer buffer 99. Then, under the control of the printer microprocessor 103, the data is printed out via printer driver 105, connector 52 and printer 53. After each data entry is transferred from the microprocessor to buffer 99, a determination is made if the end of the memory file has been reached. If not, the print (or line feed) sub-routine is repeated until the end of the memory file is reached. At that point a determination is made as to whether or not both switches 43 and 44 are in the ERASE position. Both switches must be actuated to the ERASE position in order to avoid accidental erasure of data which has been stored in memory. In other words, an operator has to use both hands to activate both switches to effect an erase operation. If both switches are not actuated, a determination is made as to whether or not switches 43 and 44 are in the PRINT or LF positions. If not, an exit from the print request sub-routine is executed. If, on the other hand, the PRINT or LF commands are present, the print and line feed requests are executed accordingly. Returning to the erase switch decision box, if both switches 43 and 44 are in the erase position, logic zeros are written into each of the data memory locations of RAM units 97, 98 to effectively erase the data file. The memory data indicator 46 is then turned off and the system proceeds to the low battery sequence.

Figure 23:
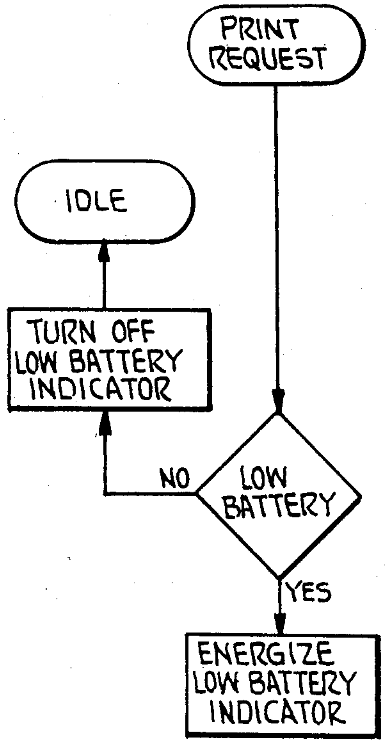

The low battery sequence is illustrated in FIG. 23 and includes a determination by voltage sensor 104 as to whether or not the battery voltage VB is below the minimum threshold level. If the LO BATT signal is present the low battery indicator which is part of display 15 is energized. If the low battery voltage condition does not exist, the low battery indicator at the display 15 is turned off and the system returns to the idle or standby mode.

It is to be understood that the system described hereinabove represents a particular embodiment and that certain specific details disclosed as part of that embodiment are not necessarily critical features of the present invention. For example, the coding technique employed in key 18 (or other coded data carrier, for that matter) does not have to be used in conjunction with a security tour recording system. Likewise, although infrared energy is used as the detecting beam, beams of other types and frequencies will be similarly employed with appropriate sources and detectors chosen.

In considering the program sequence described hereinabove, it is to be understood that the sequence from one sub-routine to the next is not necessarily followed if a higher priority request comes about during the course of program operation. For example, the highest priority in the system is the recording of data from a key inserted into the data reader. If the system happens to be in the middle of an LCD update sequence, for example, a higher priority key insert sub-routine takes command and proceeds accordingly. The order of priority of the various sub-routines is illustrated in sequence from left to right in FIG. 20.

From the foregoing description it will be appreciated that the invention makes available a novel data coding technique for a coded data carrier wherein the locations of the data code bits are evident but their binary states preferably are visually and tactually indistinguishable. In addition, a portable reader for coded data carriers is provided wherein minimum battery drain is produced and wherein a self-contained printer for producing hardcopy records is provided. Further, a novel electronic security tour recording system has been described.

Having described several embodiments of my invention, it is believed that other modifications, variations and changes will be suggested to those skilled in the art in view of the disclosure set forth above. It is therefore to be understood that all such variations, modifications and changes are believed to fall within the scope of the present invention as defined by the appended claims.

What is claimed is:

1. Apparatus for recording the attendance at and checking of plural mutually spaced station locations by a watchman, said apparatus comprising:

a plurality of coded data carriers located and secured at respective station locations, each data carrier comprising plural coded indicia uniquely identifying the station at which that data carrier is located;

a portable housing adapted to be carried to said station locations by said watchman and including passage means accessible by an access slot for permitting entry of individual data carriers into said passage means;

data reader means disposed in said portable housing for reading data from said data carriers in said passage means;

decoder means disposed in said portable housing and responsive to said data reader means for providing identification signals representing an identification of a coded data carrier which has been inserted into said passage means;

time-keeping means disposed in said portable housing for providing signals representing the time of day;

memory means disposed in said portable housing;

processing means disposed in said portable housing and responsive to said decoder means and said time-keeping means for storing in said memory means the identification and time of day of insertion into said passage means of each coded data carrier; and printer means disposed in said portable housing for printing out in alphanumeric characters the information stored in said memory means representing inserted coded data carriers and time of day of insertion.

2. The apparatus according to claim 1 wherein said memory means is a random access memory.

3. The apparatus according to claim 1 further comprising:

verification means disposed in said portable housing and responsive to said decoder means for providing a verification signal when a valid coded data carrier code has been identified in response to insertion of a coded data carrier into said passage means; and indicator means disposed in said portable housing and responsive to said indicator signal for providing a perceptible indication when a valid code has been identified.

4. The apparatus according to claim 1 further comprising:

battery means disposed in said portable housing for providing primary power for said data reader means, said decoder means, said time-keeping means, said memory means and said processing means while said portable housing is carried about to said station locations; and adapter means for receiving a.c. voltage to power said printer means during printing out of identification and time of day information.

5. The apparatus according to claim 1 wherein said coded indicia each have one of two possible physical characteristics that are not discernible from one another by human vision but which are discernible from one another by said data reader means.

6. The apparatus according to claim 1 wherein said data carrier includes a body member which is opaque to infrared light energy;

wherein said body member has a plurality of spaced apertures defined therethrough;

wherein said coded indicia include code members of first and second data materials disposed in said apertures in accordance with the identification code for the station location at which the body member is located, said first data material being opaque to infrared light energy, said second data material being transmissive to infrared light energy; and wherein said data reader means comprises data source means for emitting infrared light energy across said passage means, and infrared data detector means for receiving the infrared light energy from said source means in the absence of material, which is opaque to infrared light energy, being interposed between the source means and the detector means.

7. The apparatus according to claim 6 wherein said apertures in said body member are arranged in a straight line, wherein said source means comprises an emitter for emitting a data beam of infrared light energy across said passage means, and wherein said detector means comprises a detector disposed across said passage means from said emitter in receiving relation to said data beam, said data beam being positioned to sequentially impinge upon said apertures in said body member during insertion and withdrawal of said body member in said passage means so as to pass through said apertures or not in accordance with the data material disposed in the apertures.

8. The apparatus according to claim 7 wherein said first and second data materials are indistinguishable from one another by human vision and touch.

9. The apparatus according to claim 8 further comprising:

a plurality of synchronizing indicators disposed adjacent each respective coded indicium in said body member; and indicator recording means for sequentially reading said synchronizing indicators as said body member is inserted through said passage means and providing respective synchronization signals indicating that a respective coded indicium aperture is passing through the infrared light energy beam; and wherein said decoder means includes means responsive to said synchronization signals for establishing a time frame within which to perform a decoding operation based on the presence and absence of received infrared light energy at said detector.

10. The apparatus according to claim 9 wherein said synchronizing indicators are a plurality of open holes defined through said body member and arranged in a straight line parallel to and adjacent the straight line formed by said coded indicia apertures; and wherein said indicator reader means comprises synchronization light source means for issuing a synchronization light energy beam across said passage means in a position to be sequentially passed through said open holes across said passage means as said body member is moved through said passage means, and a synchronization detector positioned across said passage means from said synchronization light source means to receive said synchronization light energy beam.

11. The apparatus according to claim 10 further comprising end-of-carrier means for detecting when a body member has been fully inserted into said passage means, and wherein said processing means includes verification means responsive to said end-of-carrier means for providing a verification signal when a valid coded data carrier code has been identified in response to insertion of a coded data carrier into said passage means.

12. The apparatus according to claim 11 further comprising code verification indicator means disposed in said portable housing and responsive to said indicator signal for providing a humanly perceptible indication when a valid code has been identified.

13. The apparatus according to claim 1 further comprising means for selectively erasing the identification and time of day information from said memory means after it has been printed out by said printer means.

14. The apparatus according to claim 6 wherein said code members are respective inserts secured in respective apertures, each insert including a physical characteristic which identifies whether the first data material or the second data material is contained in the code member, said physical characteristic being disposed within the body member aperture in which the code member is disposed so as to be hidden from view.

15. The apparatus according to claim 14 wherein said code members and said body member are made of plastic materials which are ultrasonically weldable together, and wherein said physical characteristic comprises welding energy directing means which has a first configuration to identify said first data material and has a second configuration to identify said second data material.

16. The apparatus according to claim 15 wherein said apertures each comprise a bore having first and second sections of different size transverse cross-section at its opposite ends and a peripheral shoulder demarking a junction between said sections, and wherein said code members are made up entirely of either said first or second data material and are configured as first and second lengthwise-extending portions of different transverse cross-section which match the transverse cross-sections of said first and second bore sections, respectively, said portions being separated by a further radial shoulder configured to match the peripheral shoulder in said bore, and wherein said welding energy direction means comprises a projection from said further shoulder which is a closed loop for code members of said first data material and an open loop for code members of said second data material.

17. The apparatus according to claim 7 further comprising means operative in the absence of a coded data carrier from said passage means for deactivating said emitter to prevent emission of said data beam.

18. The apparatus according to claim 1 wherein said housing includes a lock compartment, and wherein said printer means is disposed in said lock compartment.

19. A data reading and recording system comprising:

a plurality of coded data carriers each comprising a body member having plural coded indicia arranged in spaced relation along the body member for uniquely identifying that data carrier, each of said coded indicia having a code state determined by the indicium being transmissive or opaque to light energy at a predetermined frequency, each indicium being formed by a respective aperture defined through said body member, wherein said body member is either opaque or transmissive to light energy at said predetermined frequency, and wherein each body member further includes a series of spaced strobe passages for conducting light energy through said body member, each strobe passage being positioned proximate a respective code indicium;

a data reader for reading coded data from said data carriers, said data reader including:

passage means adapted to receive a data carrier inserted into said passage means;

a data light source for controllably emitting light energy at said predetermined frequency across said passage means and in a position to pass through said apertures unless blocked by opaque material disposed in said apertures;

a data light detector disposed across said passage means from said data light source for receiving light emitted from said data light source;

a strobe source for controllably emitting light across said passage means so as to successively pass through said strobe passages in said series as a data carrier is inserted and withdrawn from said passage means;

a strobe light detector positioned across said passage means from said strobe source to receive light emitted from said strobe source which is not blocked by said body member;

means for establishing a standby mode by pulsedly actuating one of said source in the absence of a body member from said passage means to cause light emitted from said one source to be emitted as a series of light pulses of short duration and low duty cycle;

control means responsive to an interruption of said light pulses at the light detector positioned across said passage means from said one source for establishing a read mode by continuously actuating both source to emit continuous beams of light;

said control means including timer means for monitoring said read mode only for a short predetermined time interval and for thereafter automatically restoring said standby mode;

an end-of-carrier source for controllably emitting light across said passage means in a position to be intercepted by said body member after the body member has been inserted sufficiently far into the passage means to permit all of the coded indicia in said body member to pass between said data light source and said data light detector;

an end-of-carrier detector positioned across said passage means from said end-of-carrier source to receive light emitted from said end-of-carrier source which is not blocked by said body member;

said control means including means for continuously actuating said end-of-carrier source in said read mode;

said apertures and said strobe passages being arranged in said body member in respective straight lines, and wherein said apparatus further includes:

means responsive to said data light detector and said strobe light detector for decoding and temporarily storing insertion data from a coded data carrier upon the carrier being inserted into said passage means;

means responsive to interruption of the light received at said end-of-carrier detector and to said data and strobe light detectors, for decoding and temporarily storing withdrawal data from the coded data carrier as it is withdrawn from said passage means;

comparator means for comparing the stored insertion and withdrawal data;

means responsive to a match between said insertion and withdrawal data from said comparator means for permanently storing said insertion data;

the means for permanently storing being additionally responsive to said timer means for inhibiting permanent storage of the compared data unless all insertion and withdrawal data are detected from said data light detector within said predetermined short time interval of said read mode; and wherein said portable data reader is disposed in a portable housing adapted to be carried by a watchman to spaced station locations, said apparatus further comprising selectively actuable printer means disposed in said portable housing for printing out in alphanumeric characters the identification and time of insertion of coded data carriers from said means for permanently storing.

20. The apparatus according to claim 19 wherein said light energy at said predetermined frequency is infrared light energy, wherein said coded indicia are made of rigid ultrasonically weldable plastic materials, certain of said coded indicia being relatively transmissive to said infrared light energy, the others of said coded indicia being opaque to said infrared light energy, and said body member being opaque to said infrared light energy.

21. Apparatus including a coded data carrier comprising:

a rigid body member made of a base material which is non-transmissive of radiant energy in a predetermined frequency range;

a plurality of spaced data fields disposed in an array in said body member and visibly discernible in said body member by the human eye, said data fields comprising respective apertures defined through said body member, each aperture having disposed therein a code member containing either a first data material which is relatively transmissive of radiant energy in said predetermined frequency range or a second data material which is relatively non-transmissive of radiant energy in a predetermined frequency range, wherein said first and second data material appear visibly the same to the human eye;

said body member having a plurality of spaced open synchronization throughholes defined therein, at least one throughole being disposed generally proximate a respective data field;

said code members comprising respective inserts secured in respective apertures, each insert including a physical characteristic which identifies whether the first data material of the second data material is contained in the code member, said physical characteristic being disposed within the body member aperture in which the code member is disposed so as to be bidden from view; and wherein said code members and said body member are made of plastic materials which are ultrasonically weldable together, and wherein said physical characteristic comprises welding energy directing means having a first configuration to identify said first data material and a second configuration to identify said second data material.

22. The apparatus according to claim 21 wherein said apertures each comprise a bore having first and second sections with different size transverse cross-sections at its opposite ends, and a peripheral shoulder demarking a junction between said sections, and wherein said code members are made up entirely of either said first or second data material and are configured as first and second lengthwise-extending portions of different transverse cross-sections that match the transverse cross-sections of said first and second bore sections, respectively, said portions being separated by a further shoulder configured to match the peripheral shoulder in said bore, and wherein said welding energy directing means comprises an integral projection from said further shoulder which is a closed loop for code members of said first data material and an open loop for code members of said second data material.

23. The apparatus according to claim 21 wherein said energy in said predetermined frequency range is infrared energy, and wherein said first material is transmissive to infrared energy, and wherein said second data material is non-transmissive to said infrared energy.

24. The apparatus according to claim 21 further including a data reader comprising:

a housing;

passage means defined in said housing for insertably receiving said body member;

data energy source means for emitting a beam of radiant energy at said predetermined frequency across said passage means at a location such that the beam sequentially strikes said data fields as said body member is gradually passed through said passage means; and data energy detection means disposed across said passage means from said data energy source means for receiving said beam from said source means in the absence of interposed material which is non-transmissive of said beam.

25. The apparatus according to claim 24 wherein said data reader includes synchronizing means for sensing successive passage of said open synchronization throughholes past a predetermined location in said passage means.

26. The apparatus according to claim 25 further comprising data carrier end detector means disposed in said passage means for detecting insertion of said data carrier to a predetermined extent into said passage means, said predetermined extent corresponding to passage of all of said data fields through said beam and alignment of said end of data carrier opening with a radiant energy source and the end of carrier detector means of radiant energy passing through the opening.

27. The apparatus according to claim 26 wherein said data energy source means comprises means for inhibiting said beam of radiant energy in the absence of a coded data carrier from said passage means, and for providing said beam as a continuous beam in response to the presence of a coded data carrier in said passage means.

28. The apparatus according to claim 27 wherein said energy in said predetermined frequency range is infrared energy;

wherein said data energy detection means includes a further source of infrared energy for emitting a further beam of infrared energy across said passage means, and further detection means disposed across said passage means from said further infrared source for receiving said further beam through said throughholes as said throughholes pass through the further beam; and wherein said data carrier end detector means comprises another infrared energy source for emitting another energy beam across said passage means through the end of data carrier opening at a location deeper into said passage means than the location of said data energy source means, and another detector means disposed across said passage means from said another infrared source for receiving said another beam unless said another beam is interrupted by said body member.

29. Apparatus including a portable data reader and a coded data carrier comprising:

a rigid body member made of a base material which is non-transmissive of radiant energy in a predetermined frequency range a plurality of spaced data fields disposed in an array in said body member and visibly discernbile in said body member by the human eye, said data fields comprising respective apertures defined through said body member, each aperture having disposed therein a code member containing either a first data material which is relatively transmissive of radiant energy in said predetermined frequency range or a second data material which is relatively non-transmissive of radiant energy in a predetermined frequency range;

a data reader comprising:

a housing;

passage means defined in said housing for receiving said body member;

data energy source means for emitting a beam of radiant energy at said predetermined frequency across said passage means at a location such that the beam sequentially strikes said data fields as said body member is passed through said passage means;

data energy detection means disposed across said passage means from said data energy source means for receiving said beam from said source means in the absence of interposed material which is non-transmissive of said beam;

said body member having a plurality of spaced open synchronization throughholes defined therein, at least one throughhole being disposed generally proximate a respective data field;

said data reader including synchronizing means for sensing passage of said open synchronization throughholes past a predetermined location in said passage means;

said array of data fields being in first straight line and said synchronization throughholes defining a second straight line parallel to said first line, and said synchronization means comprising photodetection means;

data carrier end detector means disposed in said passage means for detecting insertion of said data carrier to a predetermined extent into said passage means, said predetermined extent corresponding to passage of all of said data fields through said beam and allignment of said end of data carrier opening with a radiant energy source and the end of carrier detector means of radiant energy passing through the opening;

there being a plurality of coded data carriers, each substantially identical to said first-mentioned coded data carrier except that the array of data fields is arranged in different sequential combinations in each body member to thereby define a unique identification code for each coded data carrier;

means securing said plurality of coded data carriers at respective mutually spaced station locations;

said housing being a portable housing in which said data reader is disposed, said housing having an access slot in communication with said passage means for permitting entry of individual coded data carriers into said passage means;

decoder means disposed in said portable housing and responsive to said data reader for providing identification signals representing an indentification of a coded data carrier which has been inserted into said passage means;

time-keeping means disposed in said portable housing for providing signals representing the time of day;

memory means disposed in said portable housing; and processing means disposed in said portable housing and responsive to said decoder means and said time-keeping means for storing in said memory means the identification and the time of day that each coded data carrier is properly inserted into said passage means.

30. The apparatus according to claim 29 further comprising selectively actuable printer means disposed in said portable housing for printing out in alphanumeric characters the identification and time of day of insertion data which are stored in said memory means.

31. The apparatus according to claim 30 wherein said memory means is a random access memory.

32. The apparatus according to claim 29 further comprising:

verification means disposed in said portable housing and responsive to said decoder means for providing a verification signal when a valid data carrier code has been identified in response to insertion of a coded data carrier into said passage means; and indicator means disposed in said portable housing and responsive to said indicator signal for providing a humanly perceptible indication when a valid code has been identified.

33. The apparatus according to claim 29 further comprising:

selectively actuable printer means disposed in said portable housing for printing out in alphanumeric characters the identification and time of insertion data which is stored in said memory means;

battery means disposed in said portable housing for providing primary power for said data reader, for said decoder means, for said time-keeping means, for said memory means and for said processing means during a mode in which said portable housing is carried to said station locations; and adapter means for receiving a.c. voltage to power said printer means during printing out of identification and time information.

34. The apparatus according to claim 33 wherein said data fields are formed by members comprised by respective inserts secured in respective apertures, each insert including a physical characteristic which identifies whether a first data material or a second data material is contained in the code member, said physical characteristic being disposed within the body member aperture in which the code member is disposed so as to be hidden from view.

35. The apparatus according to claim 34 wherein said apertures each comprise a bore having first and second sections of different size transverse cross-section at its opposite ends and a peripheral shoulder demarking a junction between said sections, and wherein said code members are made up entirely of either said first or second data material and are configured as first and second lengthwise-extending portions of different transverse cross-section which match the transverse cross-sections of said first and second bore sections, respectively, said portions being separated by a further radial shoulder configured to match the peripheral shoulder in said bore, and wherein said welding energy direction means comprises a projection from said further shoulder which is a closed loop for code members of said first data material and an open loop for code members of said second data material.

36. The apparatus according to claim 33 wherein said housing includes a lock compartment, and wherein said printer means is disposed in said lock compartment.

* * * * *